(12) United States Patent
Tate et al.

(10) Patent No.: US 11,382,263 B2
(45) Date of Patent: Jul. 12, 2022

(54) ARTICULATING CUTTING DECK

(71) Applicant: EXMARK MANUFACTURING COMPANY, INCORPORATED, Beatrice, NE (US)

(72) Inventors: Jeremy J. Tate, Beatrice, NE (US); Michael E. Allen, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 874 days.

(21) Appl. No.: 15/898,941

(22) Filed: Feb. 19, 2018

(65) Prior Publication Data
US 2019/0254228 A1 Aug. 22, 2019

(51) Int. Cl.
| A01D 34/66 | (2006.01) |
| A01D 69/00 | (2006.01) |
| A01D 34/82 | (2006.01) |
| A01D 101/00 | (2006.01) |

(52) U.S. Cl.
CPC .......... *A01D 34/661* (2013.01); *A01D 34/82* (2013.01); *A01D 69/005* (2013.01); *A01D 2101/00* (2013.01)

(58) Field of Classification Search
CPC ...... A01D 34/661; A01D 34/66; A01D 34/76; A01D 34/81; A01D 34/82; A01D 34/86; A01D 34/866; A01D 34/828; A01D 69/005
See application file for complete search history.

(56) References Cited

U.S. PATENT DOCUMENTS

| 30,327 | A | * | 10/1860 | Kroeber | E05F 1/1066 16/80 |
| 133,372 | A | * | 11/1872 | Jewett | A01K 1/0356 119/464 |
| 145,736 | A | * | 12/1873 | Humphreys | E02F 7/00 37/375 |
| 150,718 | A | * | 5/1874 | Sherrill | A47F 5/0037 211/77 |
| 189,223 | A | * | 4/1877 | Houghtaling et al. | F16H 53/06 74/569 |
| 190,270 | A | * | 5/1877 | Blackburn et al. | D05B 23/001 112/23 |
| 196,164 | A | * | 10/1877 | Parker | B66C 1/422 294/106 |

(Continued)

OTHER PUBLICATIONS

Hustler, "Hustler® Super 104 General Service Manual" 117364, Rev C, Hustler Turf Equipment, Hesston, Kansas, Date Unknown; 55 pages.

(Continued)

*Primary Examiner* — Thomas B Will
*Assistant Examiner* — Joan D Misa
(74) *Attorney, Agent, or Firm* — Mueting Raasch Group

(57) ABSTRACT

An articulating mower deck system. The system is adapted to disable power to a blade associated with the wing deck section before the wing deck section begins to lift—from an operating position toward a folded position—yet does not interfere with blade operation when the wing deck section floats relative to a center deck section during normal operation of the deck. Articulating decks of modular construction are also provided, allowing assembly of multiple deck widths with a minimum of modular deck sections.

13 Claims, 26 Drawing Sheets

(56) References Cited

U.S. PATENT DOCUMENTS

| | | | | |
|---|---|---|---|---|
| 223,397 | A * | 1/1880 | Sherrill | B66B 9/00 187/261 |
| 3,116,583 | A * | 1/1964 | Mason | A01D 34/661 56/6 |
| 3,500,619 | A * | 3/1970 | Bacon | A01D 34/661 56/6 |
| 4,395,865 | A * | 8/1983 | Davis, Jr. | A01D 34/6806 56/11.3 |
| 4,429,515 | A * | 2/1984 | Davis, Jr. | A01D 34/6806 56/13.6 |
| 4,497,160 | A * | 2/1985 | Mullet | A01D 75/30 56/11.6 |
| 4,538,400 | A * | 9/1985 | Hottes | A01D 34/661 172/75 |
| 4,660,654 | A * | 4/1987 | Wiebe | A01B 73/044 172/311 |
| 4,854,112 | A * | 8/1989 | Holley | A01D 75/30 56/6 |
| 4,864,805 | A * | 9/1989 | Hager | A01D 75/30 56/11.9 |
| 4,930,298 | A * | 6/1990 | Zenner | A01D 34/81 56/17.4 |
| 5,109,655 | A * | 5/1992 | Tekulve | A01D 75/30 56/13.6 |
| 5,177,942 | A * | 1/1993 | Hager | A01D 34/662 56/11.6 |
| 5,249,411 | A * | 10/1993 | Hake | A01D 34/76 56/11.6 |
| 5,321,938 | A * | 6/1994 | LeBlanc | A01D 34/661 56/14.7 |
| 5,435,117 | A * | 7/1995 | Eggena | A01D 34/27 56/10.2 D |
| 5,483,787 | A * | 1/1996 | Berrios | A01D 34/661 56/10.1 |
| 5,771,669 | A * | 6/1998 | Langworthy | A01D 75/306 56/6 |
| 6,494,026 | B1 * | 12/2002 | Schmidt | A01D 34/76 56/14.9 |
| 6,796,112 | B1 * | 9/2004 | Price | A01D 34/661 56/14.9 |
| 7,089,722 | B2 | 8/2006 | Laskowski | |
| 7,146,791 | B2 * | 12/2006 | Benway | A01D 42/005 56/320.2 |
| 7,640,719 | B2 * | 1/2010 | Boyko | A01D 34/661 56/13.6 |
| 7,841,157 | B2 * | 11/2010 | Latuszek | A01D 34/661 56/6 |
| 8,490,374 | B2 | 7/2013 | Latuszek et al. | |
| 9,002,585 | B2 * | 4/2015 | Porter | B60W 10/30 701/48 |
| 2002/0189223 | A1 * | 12/2002 | Degelman | A01D 34/661 56/15.2 |
| 2009/0133372 | A1 * | 5/2009 | Hironimus | A01D 57/20 56/6 |
| 2011/0030327 | A1 | 2/2011 | Latuszek et al. | |
| 2013/0145736 | A1 * | 6/2013 | Deutschle | A01D 34/66 56/6 |
| 2015/0223397 | A1 * | 8/2015 | Browning | A01D 34/73 56/17.1 |
| 2016/0150718 | A1 * | 6/2016 | Van Loen | A01B 73/046 56/7 |
| 2017/0190270 | A1 * | 7/2017 | Busboom | B60N 2/542 |
| 2017/0196164 | A1 * | 7/2017 | Bryant | B60W 30/1888 |

OTHER PUBLICATIONS

Hustler, "Hustler® Commercial Zero-Turn Mower. Super 104: 104" Width of Cut Makes Big Jobs Easy" Product Brochure. Hustler Turf Equipment, Hesston, Kansas. Oct. 2017; 2 pages.

Lastec "Lastec Deck Kit 100 EZT" Parts Manual. Manual Part #: Man-100EZT. Lastec, Inc. Lizton, IN. Copyright 2009; 111 pages.

Steiner, "Steiner: The New More Productive Flex Deck Mower by Lastec®" Product Brochure. Schiller Grounds Care, Inc., Johnson Creek, WI. Copyright 2017; 2 pages.

Toro "QUADFLOAT 126 for Groundsmaster® 455D, Model No. 30402-70001 and Up" Parts Catalog. Form No. 3319-103, The Toro Company, Copyright 1996; 24 pages.

Toro "QUADFLOAT 126 for Groundsmaster® 455D, Model No. 30402-70001 thru 90001 and Up" Operator's Manual. Form No. 3319-102 Rev. B, The Toro Company, Copyright 1997 and 1998; 20 pages.

Toro "Groundsmaster® 455-D, Model No. 30450 210000001 and Up and Model No. 30455TC 210000001 and Up" Operator's Manual. Form No. 3325-366 Rev. A, The Toro Company, Copyright 2000; 46 pages.

Toro "100-Inch Cutting Deck on Groundsmaster 360" Web Page Product Announcement [online]. [retrieved on Dec. 27, 2018]. Retrieved from the Internet: <URL: golfcourseindustry.com/product/gci-products-groundsmaster-360-100-deck/>. Feb. 12, 2014; 1 page.

Toro "100" Articulating Cutting Deck: Groundsmaster® 360 4WD Models" Product Brochure. The Toro Company. Copyright Feb. 2017; 2 pages.

Toro "100in Rear Discharge Deck: Groundsmaster® 360 Series Traction Unit, Model No. 31101—Serial No. 400000000 and Up" Parts Catalog. Form No. 3411-836, Rev A, The Toro Company, Copyright 2017; 20 pages.

Toro "Groundsmaster® 4100-D and 4110-D Rotary Mower, Model No. 30447N—Serial No. 313000001 and Up and Model No. 30449N—Serial No. 313000001 and Up" Operator's Manual. Form No. 3374-304, Rev A, The Toro Company, Copyright 2012; 68 pages.

Toro "Groundsmaster® 5900/5910, Large Area Rotary Mowers" Specifications and Features Product Brochure. The Toro Company. Copyright 2017; 4 pages.

Toro "Groundsmaster® 7200 & 7210" 2015 Toro Commercial Equipment Guide 15-003-T, Specifications and Accessories Product Brochure. The Toro Company. Copyright Feb. 2015; 7 pages.

Woods, "Woods® Rotary Cutters" Batwing™ Decks. Product Brochure. Woods Equipment Company, Oregon, IL. Copyright May 2011; 8 pages.

Toro "Hydraulic Schematic, Groundsmaster 7200 Series Traction Unit," Form No. 3384-423 Rev D, The Toro Company, Bloomington, MN. Copyright 2020 (product incorporating the "optional 100" deck, model 31101 hydraulic circuit illustrated was available at least as early as 2017). 1 page.

Toro "100in Rear Discharge Deck, Groundsmaster 360 or 7210 Series Traction Unit, Operator's Manual, Model No. 31101—Serial No. 400000000 and Up," Form No. 3419-919 Rev B, The Toro Company, Bloomington, MN. Copyright 2020 (version of depicted product available at least as early as 2017). 28 pages.

* cited by examiner

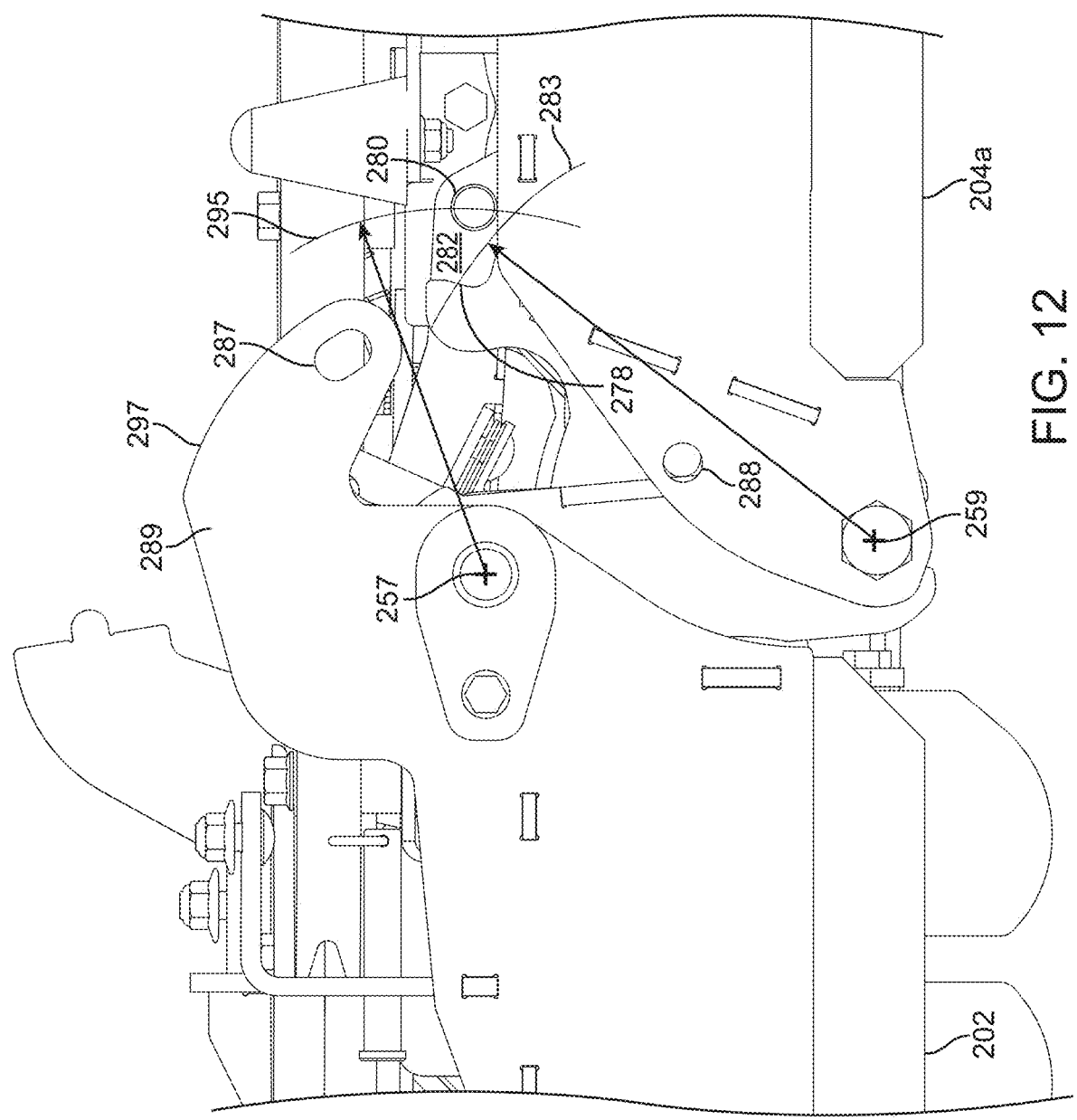

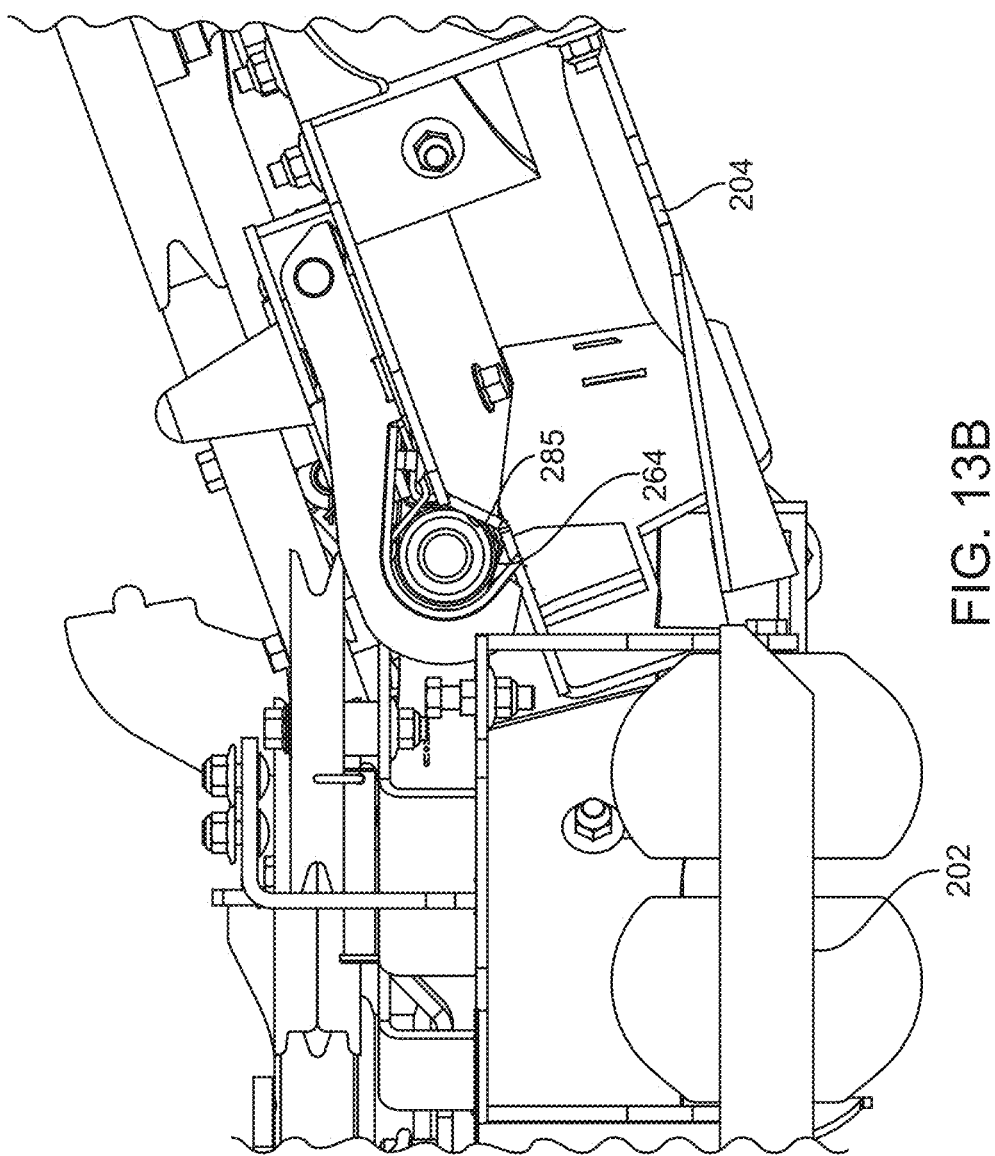

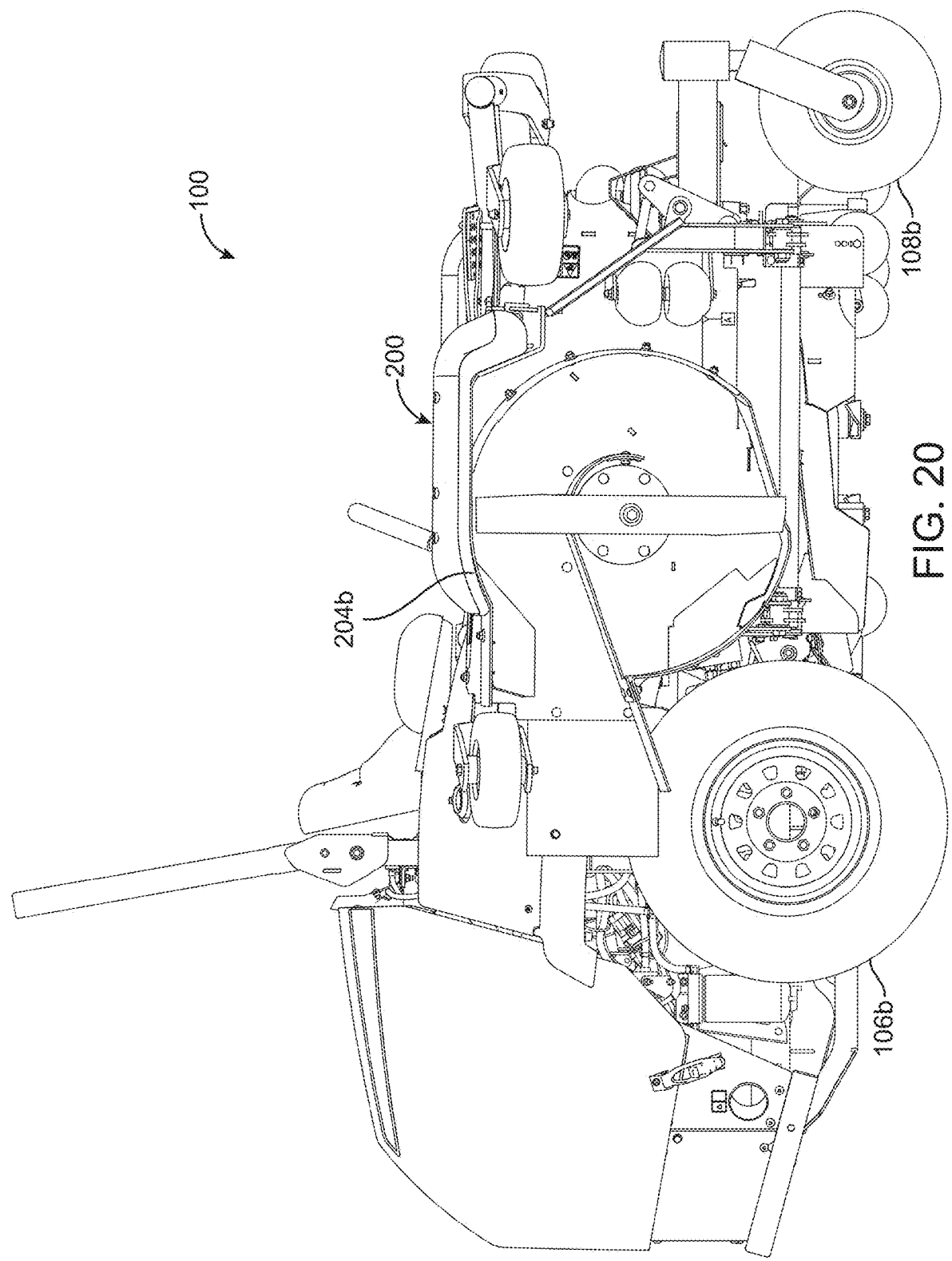

ARTICULATING CUTTING DECK

Embodiments of the present disclosure are directed to riding lawn mowers, and more particularly, to articulating cutting decks and associated fold mechanisms, as well as to articulating decks using modular deck sections.

BACKGROUND

Large turf mowing machines have long been known for providing a high quality and efficient cut on relatively flat and unobstructed terrain. For example, the wide cutting swath typical of these mowers allows for productive cutting of large turf areas such as golf courses, sports fields, and the like. However, conventional large cutting decks may struggle to provide the same high quality of cut when mowing hilly or other highly contoured terrain.

To address this issue, articulating decks, i.e., decks that segment the cutting unit into a plurality of narrower cutting deck sections, are available. The deck sections are joined (e.g., pivotally) together to create a relatively wide cutting deck with individually movable (articulating) deck segments. As the individual sections are able to closely follow the terrain, articulating decks may provide a higher quality of cut over undulating terrain than a non-articulating deck of similar width.

While effective, problems remain. For instance, when the outboard cutting deck section is pivotally attached to a central cutting deck section and powered by an interconnecting belt, the belt may become slack when the outer cutting deck section is displaced sufficiently upwards such as may occur when the outer cutting deck section encounters a raised turf area. Moreover, articulating decks, even when folded, are typically much wider than a track width of the mower to which they are attached. Thus, increased mower transport (e.g., trailer) and storage space may be required. Still further, articulating decks are generally manufactured based upon specific width requirements, requiring dealer/distributors to stock numerous deck assemblies in order to provide a range of deck widths.

SUMMARY

Embodiments of the present disclosure may address these and other issues with articulating cutting decks. For example, embodiments described herein may provide a mower cutting deck including: a center deck section; a wing deck section having at least one cutting blade; and a fold link connecting the center deck section to the wing deck section. The fold link includes: a first pivot pivotally connecting the fold link to the center deck section, the first pivot defining a first pivot axis; and a second pivot defining a second pivot axis offset from the first pivot axis, the second pivot pivotally connecting the fold link to the wing deck section. The fold link is adapted to pivot about the first pivot between: a first position corresponding to the wing deck section being in an operating position; and a second position corresponding to the wing deck section being in a folded position. A deck drive system is also included and adapted to provide power to the wing deck section to rotate the cutting blade when the fold link is in the first position; and automatically terminate power to the wing deck section when the fold link moves out of the first position.

In another embodiment, a riding lawn mower is provided that includes: a chassis comprising a front end and a back end and a longitudinal axis extending between the front and back ends; a prime mover attached to the chassis; one or more front ground-engaging members connected to the chassis at or near the front end; first and second rear ground-engaging members connected to opposite sides of the chassis at or near the back end, wherein outer surfaces of the rear ground-engaging members define a track width of the mower; and an articulating cutting deck. The cutting deck includes: a center deck section operatively connected to the chassis at a location between the front and rear ground-engaging members; a wing deck section connected to a lateral side of the center deck section and configured to move between an operating position and a non-operating, folded position; and a fold link connecting the center deck section to the wing deck section. The fold link includes a first pivot pivotally connecting the fold link to the center deck section. The first pivot defines a first pivot axis, wherein the first pivot axis is located within the track width.

In yet another embodiment, an articulating mower cutting deck system is provided that includes a universal center deck section having a base cutting width adapted to attach to an underside of a riding lawn mower between front and rear wheels of the mower. A first wing deck section having a first cutting width is also provided, the first wing deck section adapted to couple to a first lateral side of the center deck section. In addition, a second wing deck section having a second cutting width is provided, the second wing deck section adapted to couple to a second lateral side of the center deck section to produce a first articulating cutting deck width. Finally, a third wing deck section having a third cutting width different than the second cutting width is provided, wherein the third wing deck section is adapted to couple to the second lateral side of the center deck section, in place of the second wing deck section, to produce a second articulating cutting deck width different than the first articulating cutting deck width.

In still yet another embodiment, a mower cutting deck is provided that includes: a center deck section; a wing deck section; and a wing pivot defining a wing pivot axis. The wing pivot pivotally connects the wing deck section to the center deck section, wherein the wing deck section, when in an operating position, is constrained to pivoting, about the wing pivot, between a down float limit and an up float limit. A deck drive system is also provided and includes an endless belt engaged with a first pulley on the center deck section and a second pulley on the wing deck section. A section of the endless belt extending between the first and second pulleys intersects a vertical plane parallel to the wing pivot axis at a positive angle when the wing deck section is at or near the down float limit, and at a negative angle when the wing deck section is at or near the up float limit.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 8A-8C are partial front elevation views of the deck fold mechanism of FIG. 6, the deck shown in the operating configuration (i.e., wing deck section shown in the operating position), wherein: FIG. 8A shows the deck when operating on a level ground surface; FIG. 8B shows the deck when the wing deck section is pivoted downwardly until contacting a down float stop; and FIG. 8C shows the deck when the wing deck section is pivoted upwardly until contacting an up float stop;

FIG. 12 diagrammatically illustrates operation of the down float stop of FIG. 11;

FIGS. 13A-13B illustrate an up float stop adapted to limit upward float movement of the wing deck section when the cutting deck is in the operating configuration in accordance with embodiments of the present disclosure, wherein: FIG. 13A is a perspective section view (with some structure removed) taken along a transverse plane of the cutting deck of FIG. 6 illustrating a debris shield and the up float stop; and FIG. 13B is a section view illustrating contact with the up float stop;

FIGS. 14A-14B illustrate a partial front elevation view of the fold mechanism at an intermediate position between the operating and folded positions of the wing deck section, wherein: FIG. 14A illustrates an ear of the center deck section having a cam surface engaging a plate (shown in broken lines) of the wing deck section to minimize pivoting of the wing deck section about a wing pivot axis; and FIG. 14B illustrates the same view with some weldment structure removed to better illustrate the cam surface and plate;

FIGS. 17A-17C are top plan views of the deck of FIG. 4 illustrating an exemplary drive system, wherein: FIG. 17A illustrates belt routing when the deck is in the operating configuration and operating on a level ground surface; FIG. 17B illustrates belt routing when the deck is in the operating configuration and operating with the wing deck sections at or near their respective down float stops; FIG. 17C illustrates belt routing when the deck is in the operating configuration and operating with the wing deck sections at or near their respective up float stops;

FIG. 20 is a side elevation view of the mower of FIG. 19.

Figure 1:
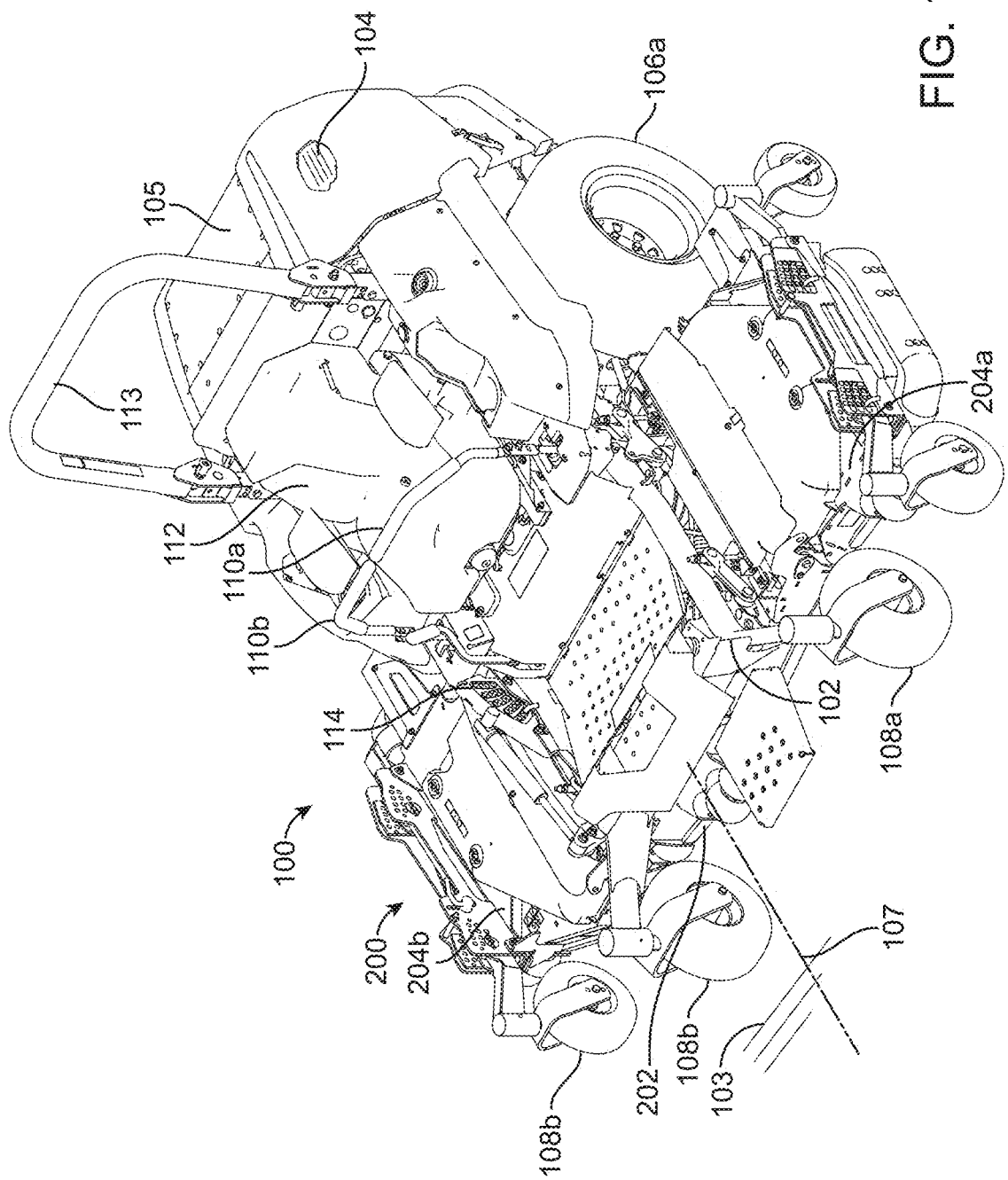
FIG. 1 is a perspective view of a riding ground working vehicle configured as a zero-turn-radius (ZTR) lawn mower, the mower having a belly-mounted articulating cutting deck in accordance with embodiments of the present disclosure, wherein the deck is shown in an operating configuration (corresponding to wing deck sections each being in an operating position)

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Figure 2:
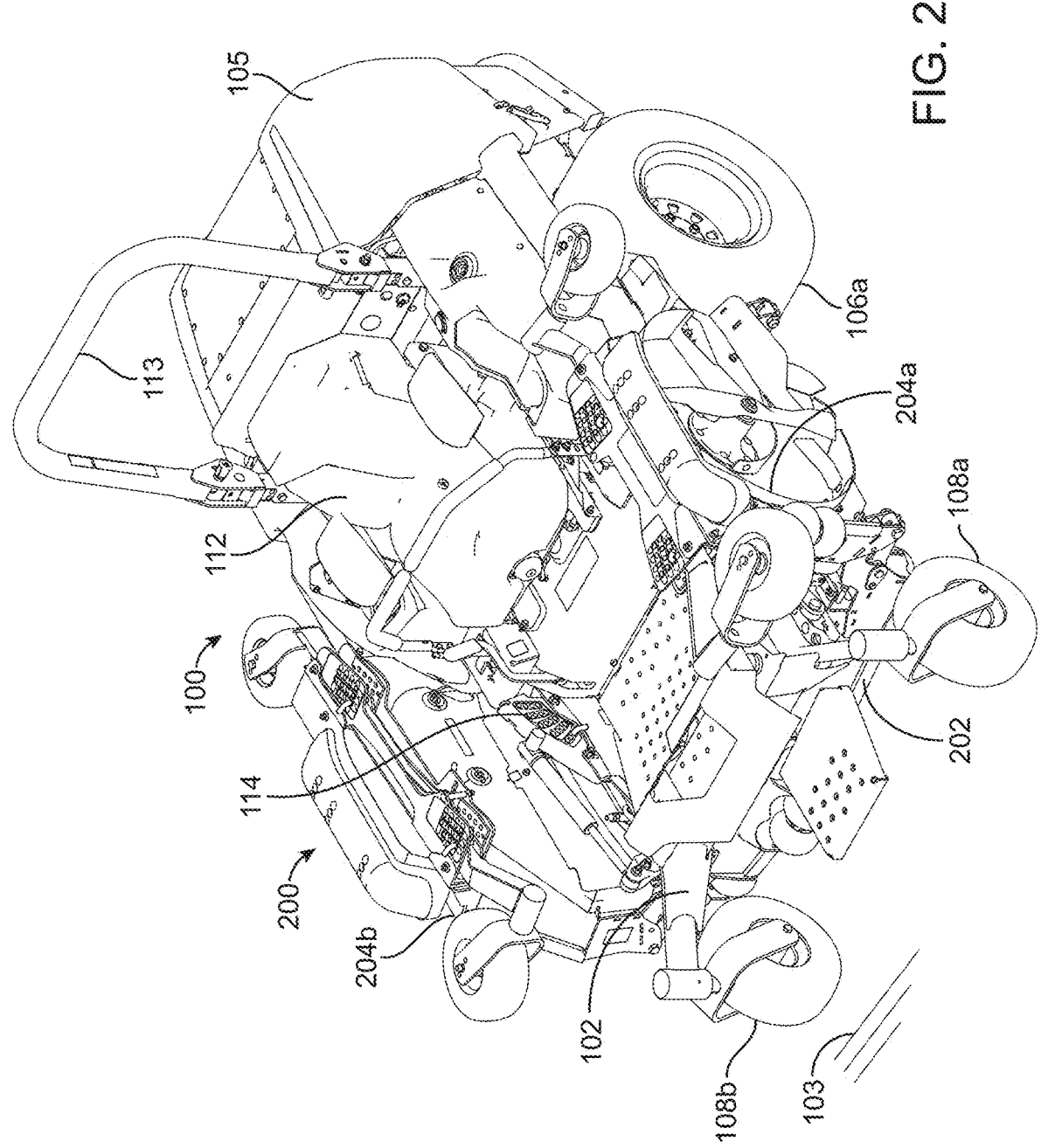
FIG. 2 illustrates the mower of FIG. 1 with the deck shown in a folded (non-operating) configuration (corresponding to the wing deck sections each being in a folded position)

With reference to the figures of the drawing, wherein like reference numerals designate like parts and assemblies throughout the several views, FIGS. 1 and 2 illustrate a riding grounds maintenance vehicle (e.g., lawn mower 100) with an articulating cutting deck 200 in accordance with embodiments of the present disclosure. While shown as a riding mower, e.g., a zero-turn-radius (ZTR) riding lawn mower 100 (also referred to herein simply as a "vehicle" or "mower"), decks in accordance with embodiments of the present disclosure may find application to other types of mower configurations (e.g., out front, towed, etc.).

As shown in FIGS. 1 and 2, the mower 100 may include a chassis or frame 102 supporting a prime mover, e.g., electric motor or internal combustion engine 104 (which may be partially enclosed by an engine cover 105 as shown). Left and right ground engaging drive members (e.g., rear wheels 106, of which only left wheel 106a is visible in FIG. 1, but see wheel 106b in FIG. 3) may be rotatably coupled to the chassis 102 at left and right sides, respectively, near a back end of the mower 100. The drive wheels 106 may be independently powered by the engine (e.g., via one or more hydraulic motors, transaxles, transmissions, or the equivalent) so that the drive wheels 106 may selectively propel the mower 100 over the ground surface 103 during operation.

The suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

One or more controls, e.g., left and right drive control levers 110 (e.g., 110a, 110b) may also be provided. The drive control levers 110 may be pivotally coupled to the chassis 102 such that they may pivot forwardly and rearwardly, e.g., about an axis transverse to a longitudinal axis 107 (an axis extending between the front and back ends of the mower parallel to straight-ahead travel of the mower/chassis), under the control of an operator located upon an operator platform, e.g., sitting in an operator seat 112. The drive control levers 110 are operable to independently control speed and direction of their respective drive wheels 106 via manipulation of the mower's drive system as is known in the art. While illustrated herein as incorporating separate drive control levers 110, other controls, e.g., single or multiple joysticks or joystick-type levers, steering wheels, etc. may also be used without departing from the scope of the disclosure. The mower 100 may further include various other controls (power take-off (PTO) engagement, ignition, throttle, etc.), as are known in the art. In some embodiments, a roll-over-protection system (ROPS) that includes a roll-over bar 113 may also be provided.

The illustrative mower 100 may further include one or more, e.g., a pair of, front swiveling caster wheels 108 (108a, 108b) that support a front end or portion of the mower 100 in rolling engagement with the ground surface 103. Of course, other drive configurations (e.g., actively steered front and/or rear wheels, tri-wheel configurations, front drive wheels, etc.) and vehicles using drive members other than wheels (e.g., tracks), are certainly contemplated within the scope of this disclosure.

Figure 3:
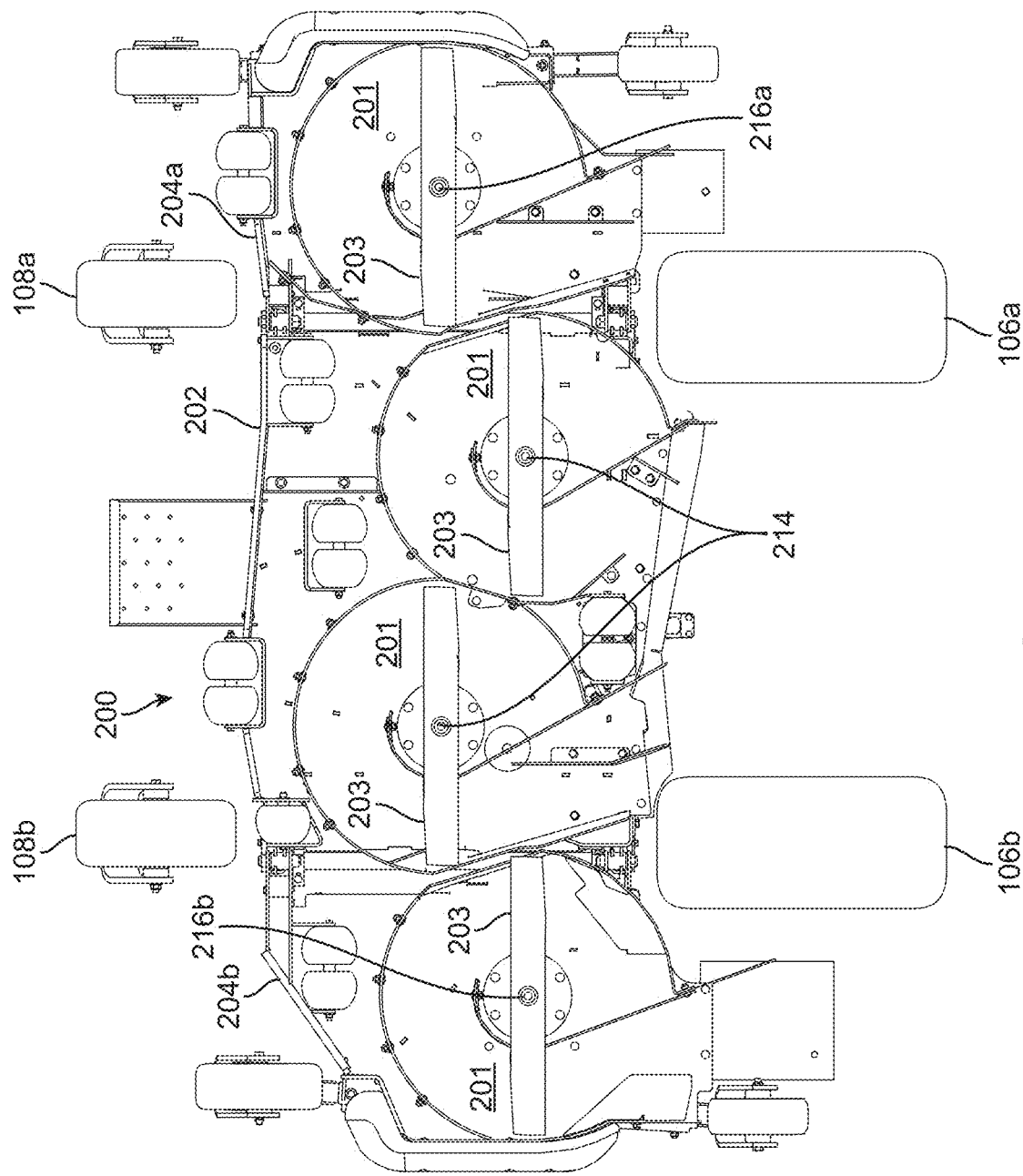
FIG. 3 is a bottom plan view of the articulating cutting deck of FIG. 1 (in the operating configuration), wherein the deck includes a center deck section and two (i.e., left and right) single-spindle wing deck sections (various structure is removed from this and remaining figures to better illustrates aspects of the described embodiments)

The mower 100 may further include an articulating lawn mower cutting deck 200 mounted to a lower side of the chassis 102, e.g., generally between the drive wheels 106 and the caster wheels 108. The cutting deck 200, which is described in more detail below, may include deck sections each forming a deck housing defining at least one partially enclosed cutting chamber 201 as shown in FIG. 3. Within each cutting chamber 201 is one or more rotatable cutting blades 203, each attached to a rotatable blade spindle (214, 216) journalled to the respective deck housing. Once again, while illustrated herein as a belly-mount deck, other mower configurations may, alternatively or in addition, utilize other deck configurations (e.g., an out-front or rear-mounted (e.g., towed) deck).

During operation, power is selectively provided by the engine 104 to the cutting deck 200 (e.g., to the spindles 214, 216) and the drive wheels 106, whereby the cutting blades rotate at a speed sufficient to sever grass and other vegetation as the deck passes over the ground surface 103. Typically, the cutting deck 200 further has an operator-selectable height-of-cut control system 114 to allow deck height adjustment relative to the ground surface 103.

With this general overview of exemplary vehicle structure, an articulating cutting deck 200 in accordance with embodiments of the present disclosure is now described with continued reference to FIGS. 1 and 2. As shown in these views, the deck 200 may, in some embodiments, include a center deck section 202 and at least one wing deck section. For example, in the illustrated embodiment, the deck 200 may include left- and right-wing deck sections 204a, 204b connected to left- and right-lateral sides of the center deck section, respectively. The wing deck sections 204a, 204b may each move between an operating position (corresponding the deck 200 being in an operating configuration) as shown in FIG. 1, and a folded or non-operating position (corresponding to the deck being in a folded configuration) as shown in FIG. 2. Exemplary systems and fold mechanisms adapted to control deck folding are described in detail below.

Figure 4:
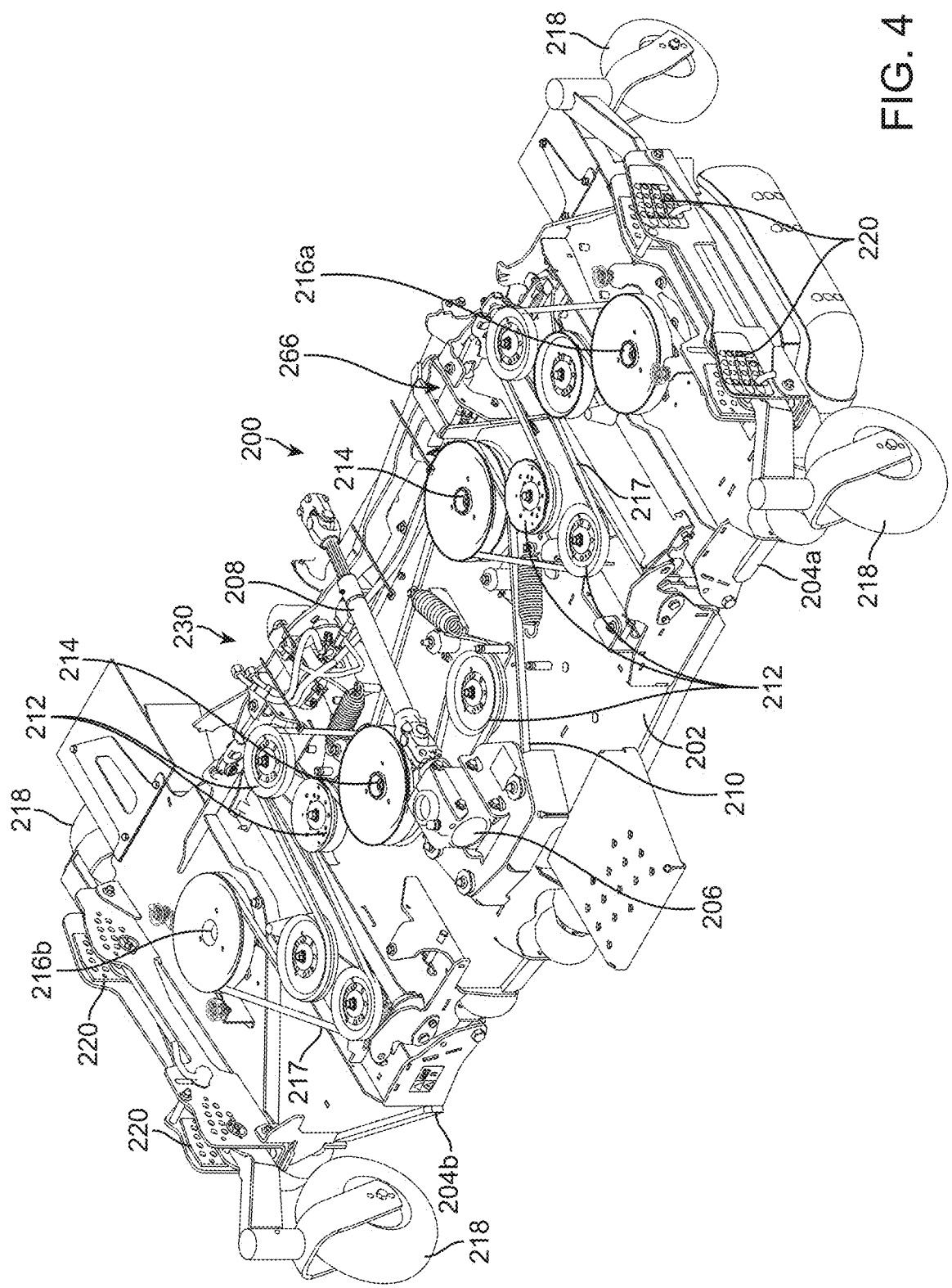
FIG. 4 is an upper perspective view of the articulating cutting deck of FIG. 3 (operating configuration) isolated from the mower.
Figure 5:
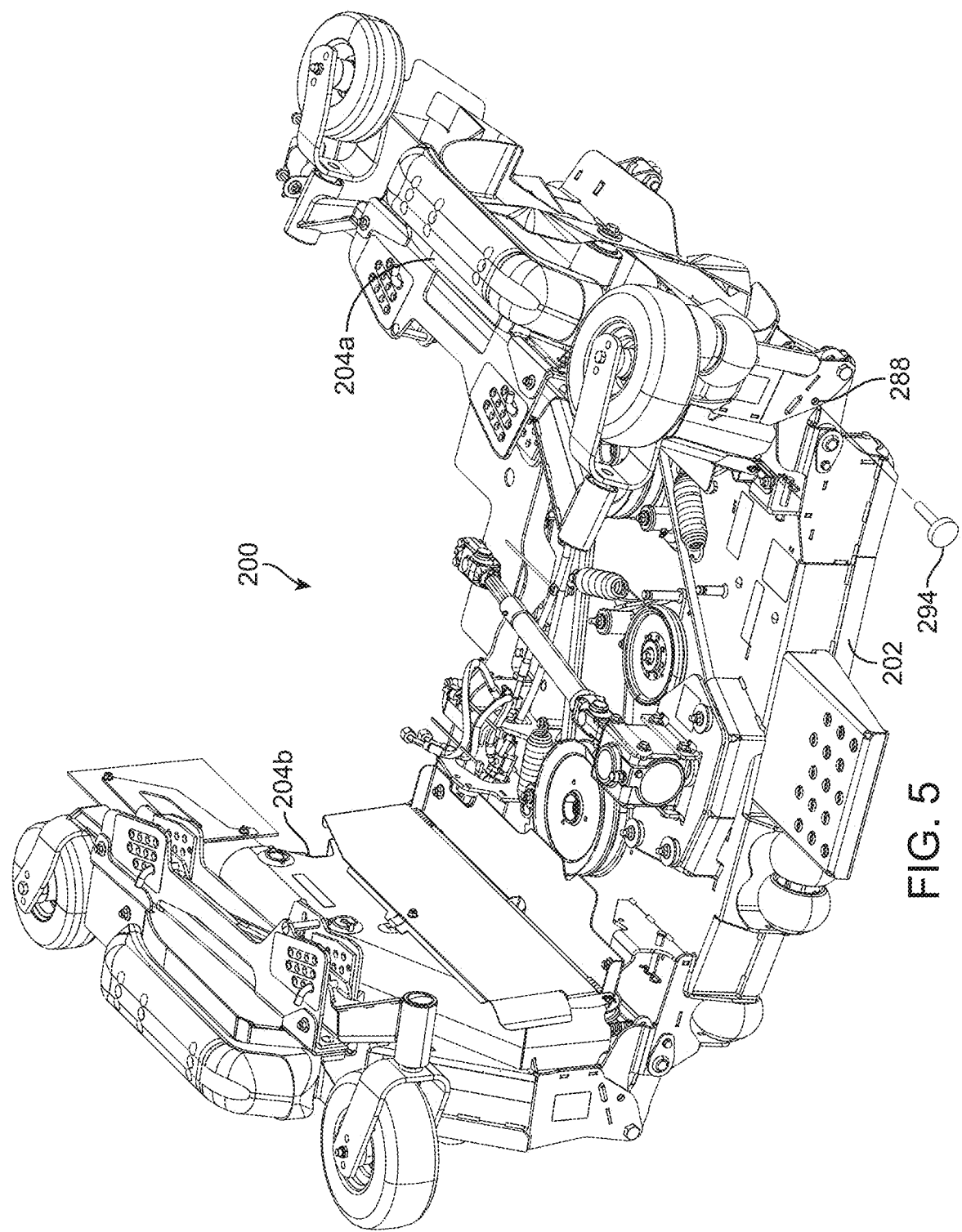
FIG. 5 is an upper perspective view of the articulating cutting deck of FIG. 2 (folded configuration) isolated from the mower.

FIGS. 4 and 5 illustrate the cutting deck 200 isolated from the remaining portions of the mower, wherein FIG. 4 illustrates the deck in the operating configuration, while FIG. 5 shows the deck in the folded configuration. As illustrated in these views, the center deck section 202, which may operatively connect to an underside of the chassis of the mower at a location between the front and rear wheels 108, 106 may include a gearbox 206 connected by a drive shaft 208 to the engine 104 via a clutch (not shown). When power is selectively delivered to the gearbox 206 via the clutch through the drive shaft 208, one or more endless belts 210 entrained about a plurality of pulleys 212 journalled to the various deck sections may cause spindles 214 on the center deck section 202, and spindles 216a, 216b on the left and right wing deck sections 204a, 204b, respectively, to rotate. Attached to lower ends of the spindles 214, 216 are the blades 203 as best shown in FIG. 3. Accordingly, providing power to the gearbox 206 (via the drive shaft 208) may cause the blades 203 to rotate (assuming the deck is in the operating configuration). Exemplary drive systems are further described below with reference to FIGS. 17A-17C.

The center deck section 202 may be supported by the mower chassis 102 such that its elevation may be adjusted using the height of cut control system 114 (see FIG. 1). As further described below, inboard sides of the wing deck sections 204 may be pivotally supported by the center deck section 202, while outboard sides of the wing deck sections may be supported, relative to the ground surface, by gauge wheels 218. The gauge wheels may be adjustable, relative to the respective deck sections 204, by height adjusters 220 as shown in FIG. 4 to adjust the height of cut for the wing deck sections.

Figure 6:
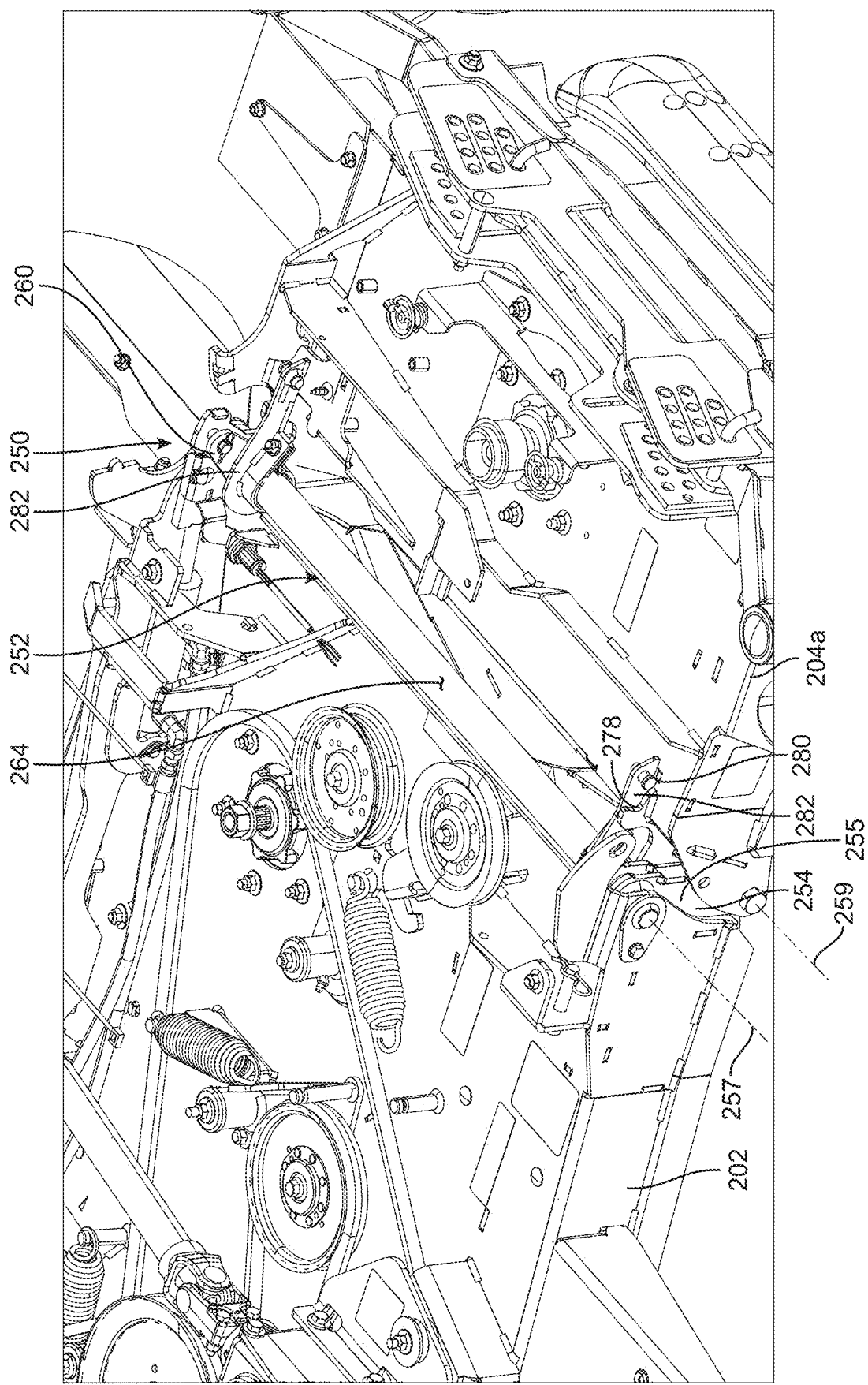
FIG. 6 is an enlarged perspective view of an articulating cutting deck in accordance with embodiments of the present disclosure illustrating aspects of a deck fold mechanism for connecting a wing deck section to a center deck section (again, some structure is removed from the deck in this and other views to better illustrate embodiments of this disclosure)

When the cutting deck is not operating, the wing deck sections 204 may be moved from the operating position shown in FIG. 4 to the folded position shown in FIG. 5 via a fold mechanism 250, an exemplary embodiment of which is shown in FIG. 6. The fold mechanism 250 may allow not only movement of the wing deck sections between the two positions, but retention in those positions as well. While described below in the context of the fold mechanism 250 for the left-side wing deck section 204a, it is understood that the right-side wing deck 204b utilizes a similar fold mechanism.

Figure 7:
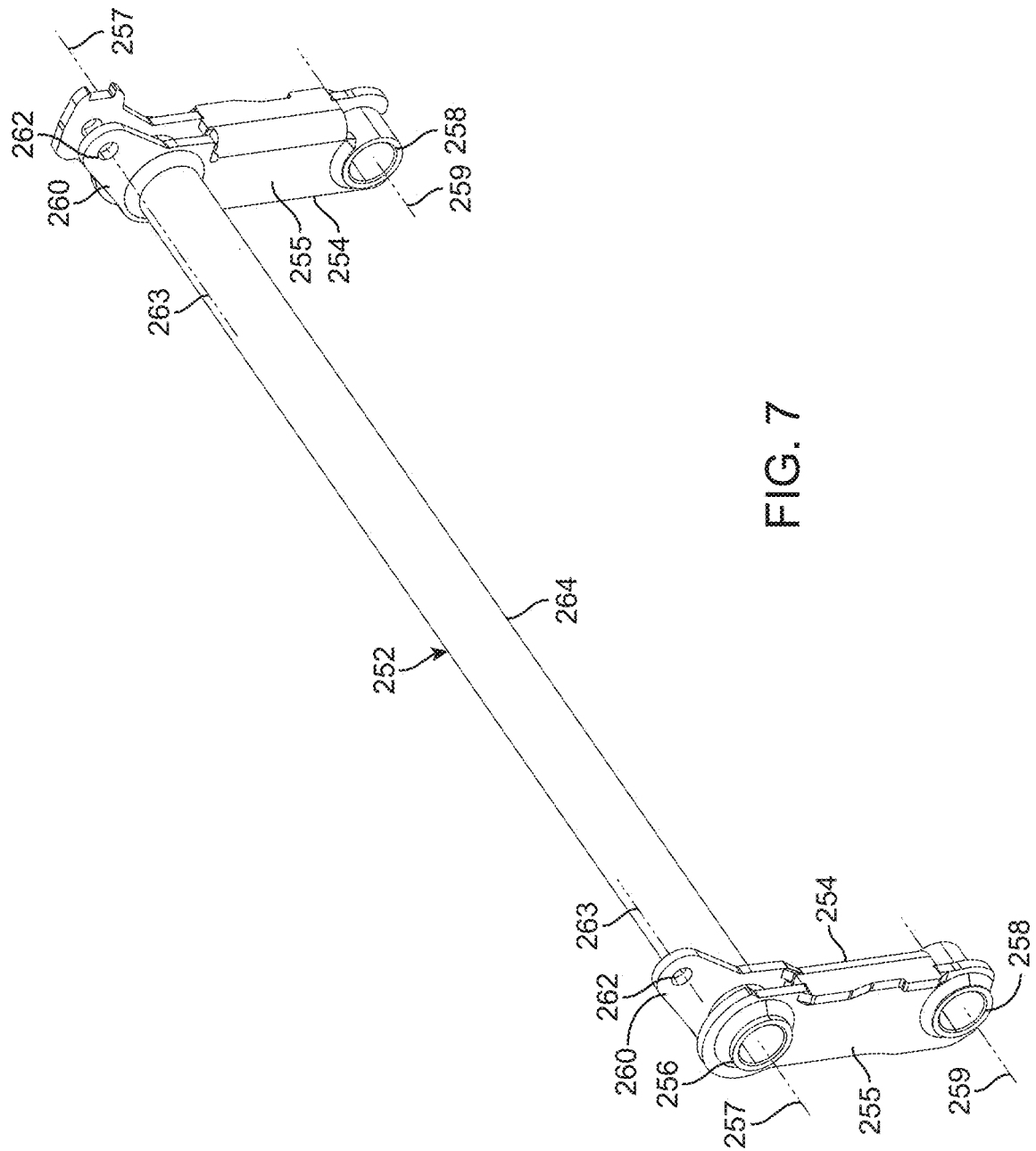
FIG. 7 illustrates a fold link isolated from the deck fold mechanism of FIG. 6.

As shown in FIG. 6 (some structure removed for clarity in this view), the fold mechanism 250 may include a fold link 252 connecting the center deck section to the wing deck section, an embodiment of which is illustrated isolated from the deck 200 in FIG. 7. The fold link 252 may include, in one embodiment, two spaced-apart bellcranks 254 each defining a deck arm 255 extending between a first or fixed pivot 256 (defining a first or fixed pivot axis 257) and a second or wing pivot 258 (defining a second or wing pivot axis 259). At least one of the bellcranks 254 may further include a lift arm 260 extending between the fixed pivot 256 and a lift arm pivot 262 (defining a lift arm pivot axis 263). A pivot tube 264 may extend between the two bellcranks 254 (e.g., along the pivot axis 257) as shown in FIG. 7. The pivot tube 264 may be welded or otherwise fixed to the two bellcranks 254 to form a unitary structure. In alternative embodiments, the pivot tube 264 and bellcranks 254 may be manufactured (e.g., cast or forged) as a single component. The pivot axes 257, 259, and 263 are offset from, and optionally parallel to, one another such that a force applied, for example, at the lift arm pivot 262 will cause the fold link 252 to rotate about the fixed pivot 256 (pivot axis 257) and, accordingly, pivotally displace the wing pivot 258.

The fold link 252 may generally extend from a front side of the center deck section 202 to a rear side as shown in FIG. 6 (i.e., a bellcrank 254 may be positioned near both the front and rear sides of each wing deck section). By interconnecting the two bellcranks 254 together with the pivot tube 264, uniform movement (pivoting) of the two bellcranks may result. As a result, actuating forces (i.e., to move the wing deck section 204 between the operating and folded positions) applied to one bellcrank 254 may be distributed to front and rear ends of the wing deck section as described below. However, while shown as using dual bellcranks 254 interconnected by the pivot tube 264, other embodiments may provide the desired functionality with a single bellcrank 254, thereby negating the need for the pivot tube 264.

With reference to FIGS. 6 and 7, the fixed pivot 256 of the fold link 252 may be journaled (pivotally connected with appropriate bearings) to the center deck section 202 such that the fold link may pivot relative to the center deck section 202 about the fixed pivot axis 257. The wing deck section 204a may then be attached to the wing pivot 258 such that it may rotate, about the wing pivot axis 259, relative to the fold link 252/bellcrank 254. As a result, the fold mechanism 250 provides a dual pivot geometry that provides various benefits, some of which are described in more detail below.

Figure 8A:
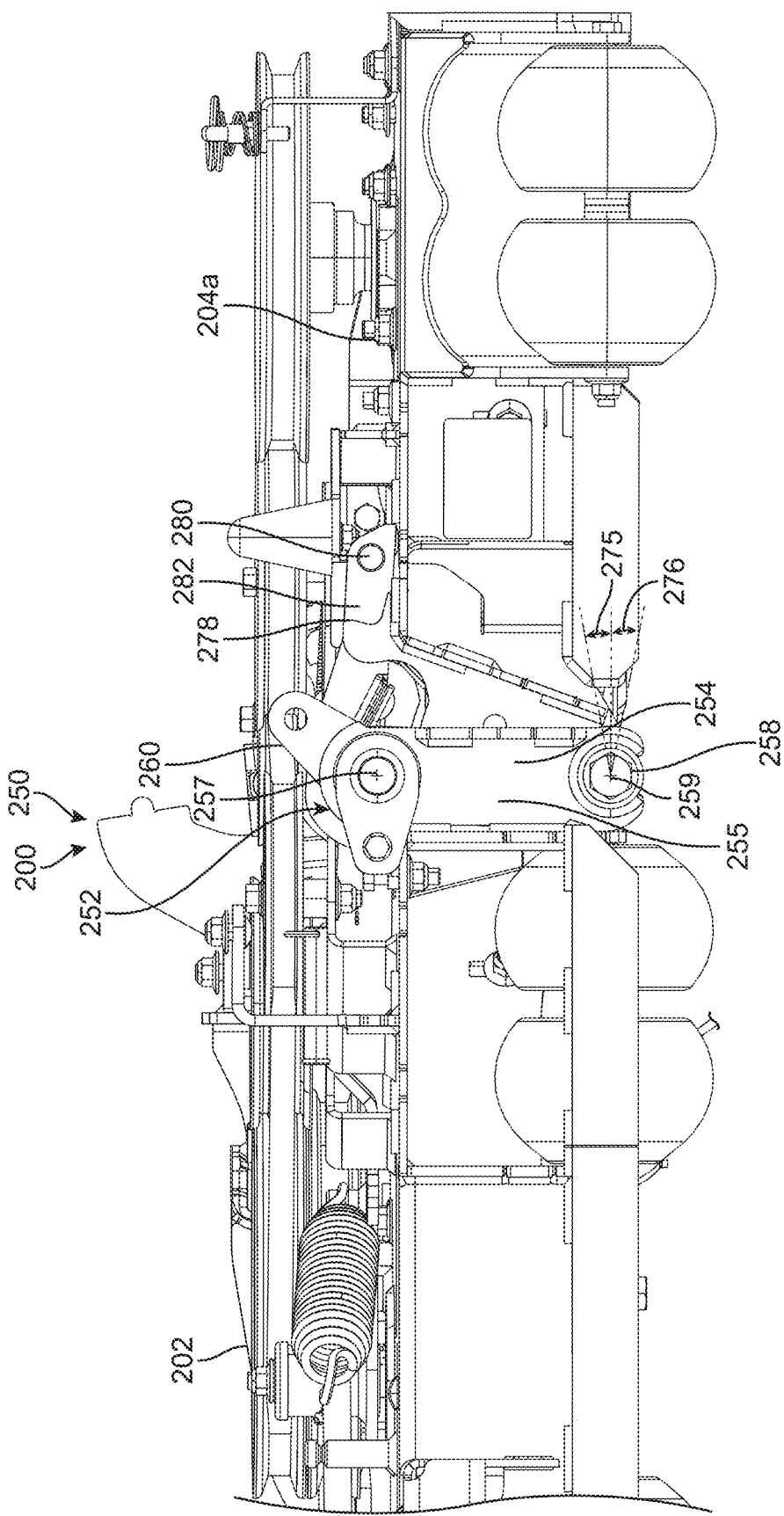
Figure 8B:
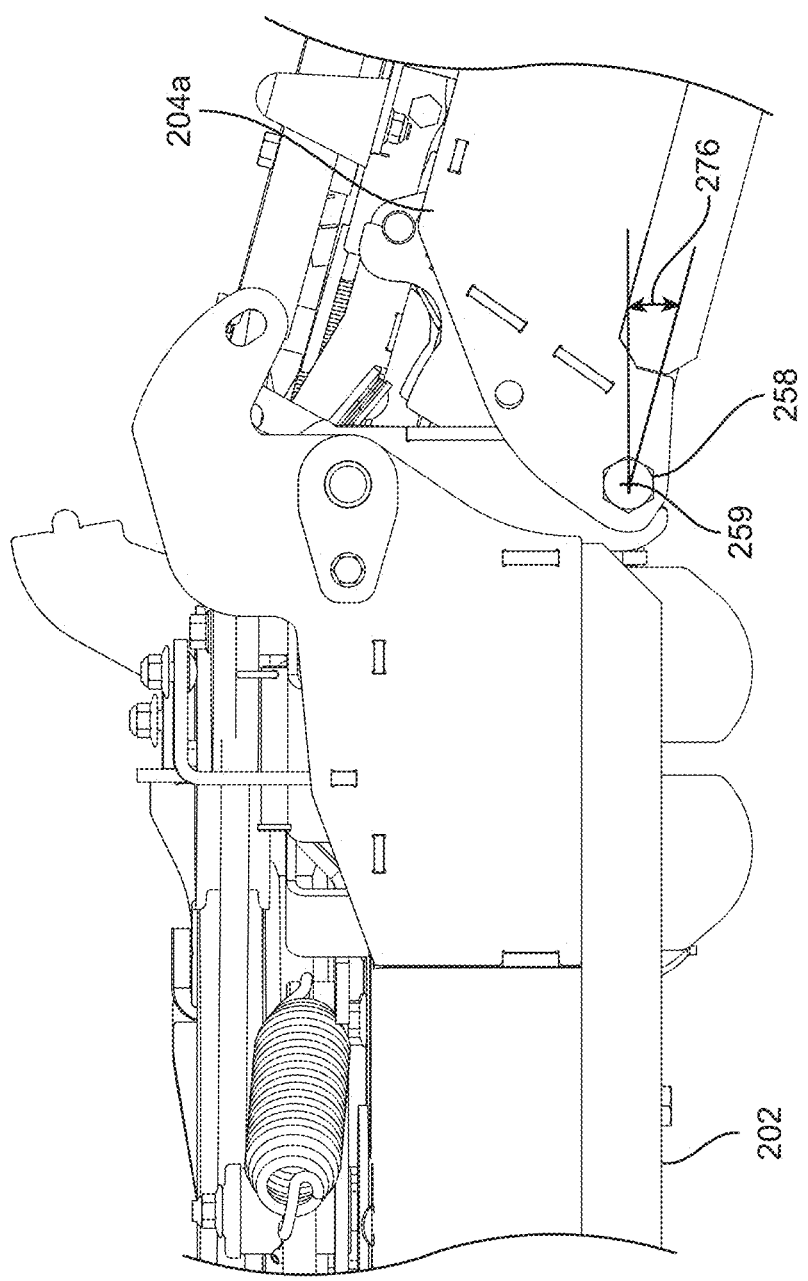
Figure 8C:
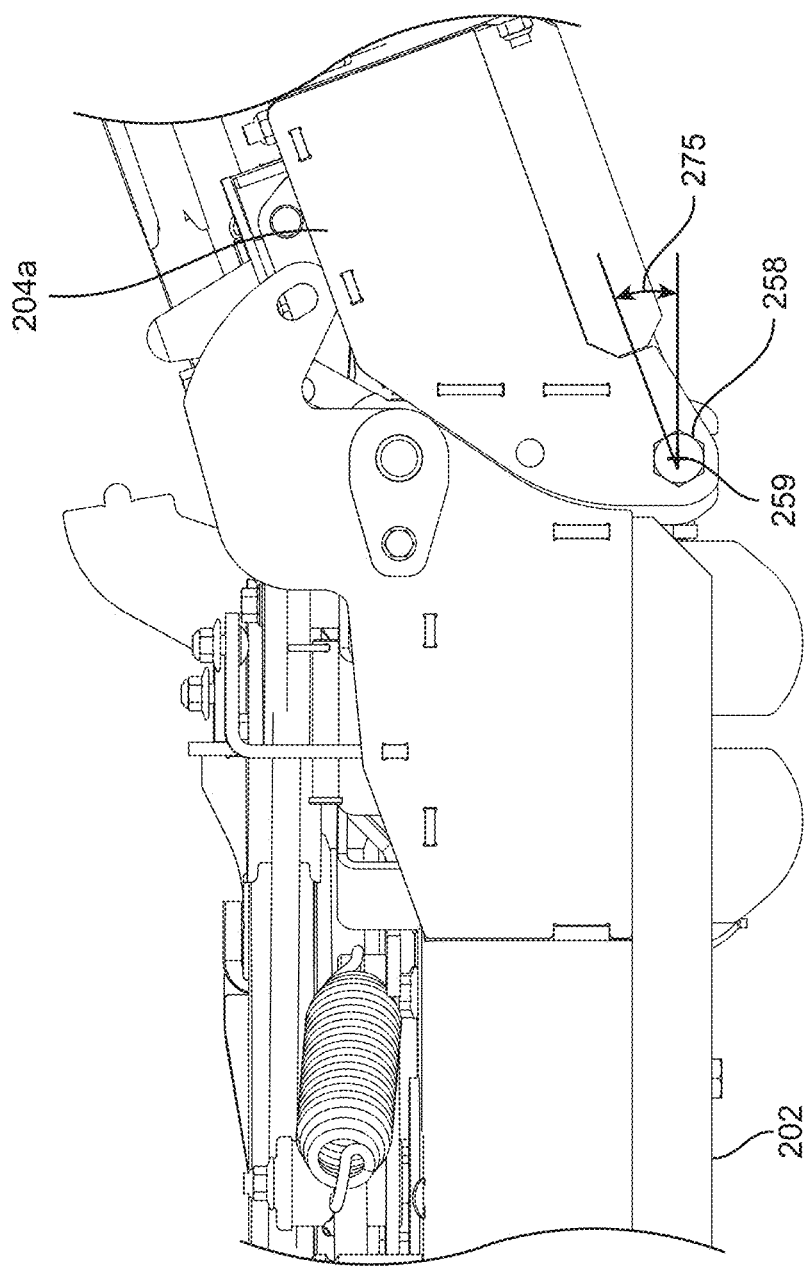
Figure 9:
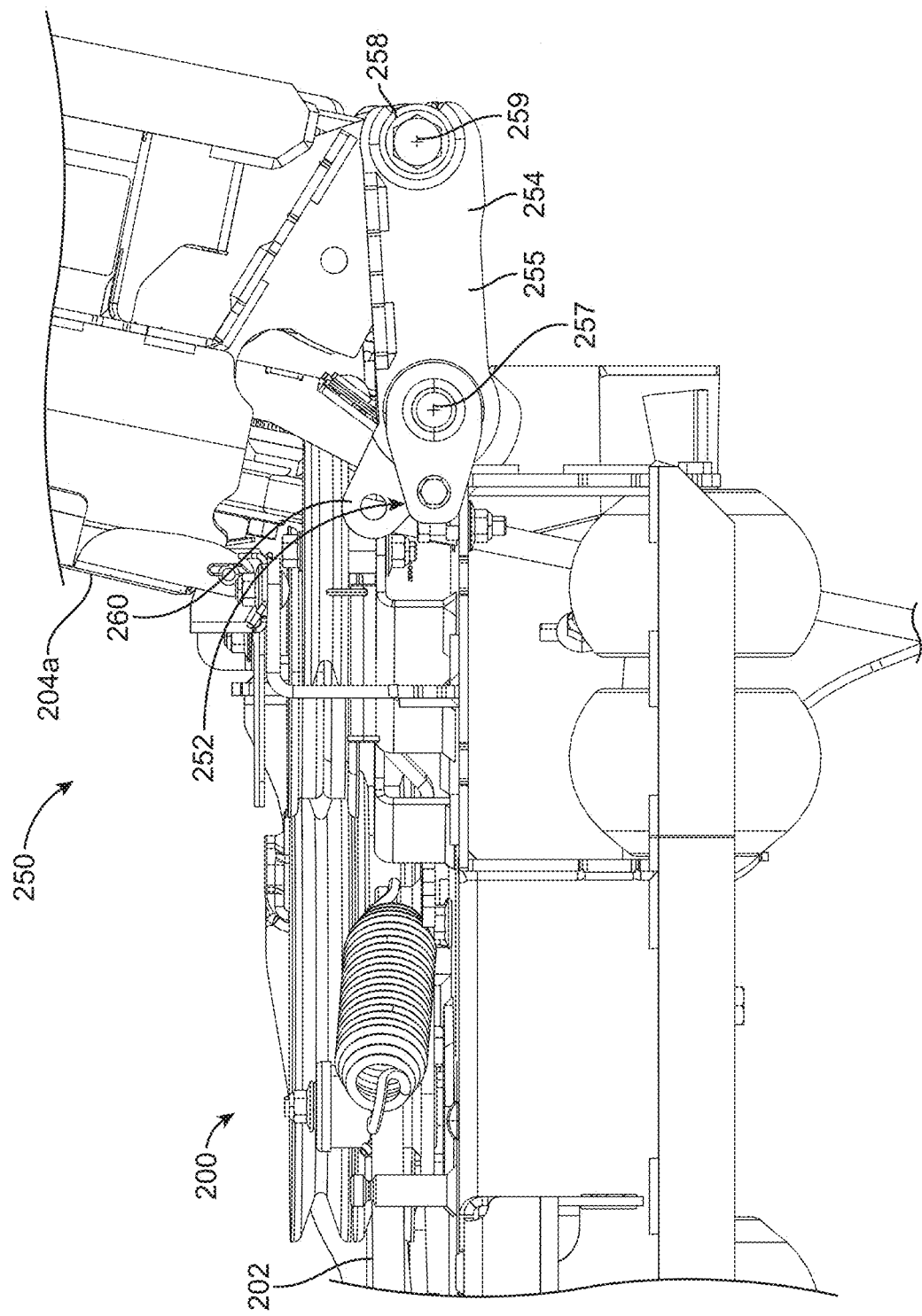
FIG. 9 is a view similar to FIG. 8A, but showing the deck in the folded configuration (i.e., wing deck section shown in the folded position)

Exemplary operation of the fold mechanism 250 is illustrated in FIGS. 8A-8C and 9. In FIG. 8A, the fold link 252 is shown in a first position corresponding to the wing deck section 204a being in the operating position. In this configuration, the deck arm 255 of each bellcrank 254 is generally vertical (i.e., the wing pivot axis 259 is located generally vertically below the fixed pivot axis 257). However, when the fold link 252 (e.g., bellcranks 254) is rotated to a second position as shown in FIG. 9 (e.g., via application of a force applied to the rear lift arm 260 as described below), the wing pivot axis 259 (and thus the wing pivot 258) may move to a position that is generally horizontal from the fixed pivot axis 257. This motion of the fold link 252, in combination with the eventual interaction of the down float stop 278 with the tab 280 (described in more detail below), ultimately causes the wing deck section 204a to move to its folded position as shown. While shown herein as orienting the fold link 252/bellcranks 254 generally vertically (when the wing deck section is in the operating position) and horizontally (when the wing deck section is in the folded position), such positions are exemplary only as the bellcranks may be configured to be in most any orientation in the various fold link positions without departing from the scope of this disclosure.

Figure 10:
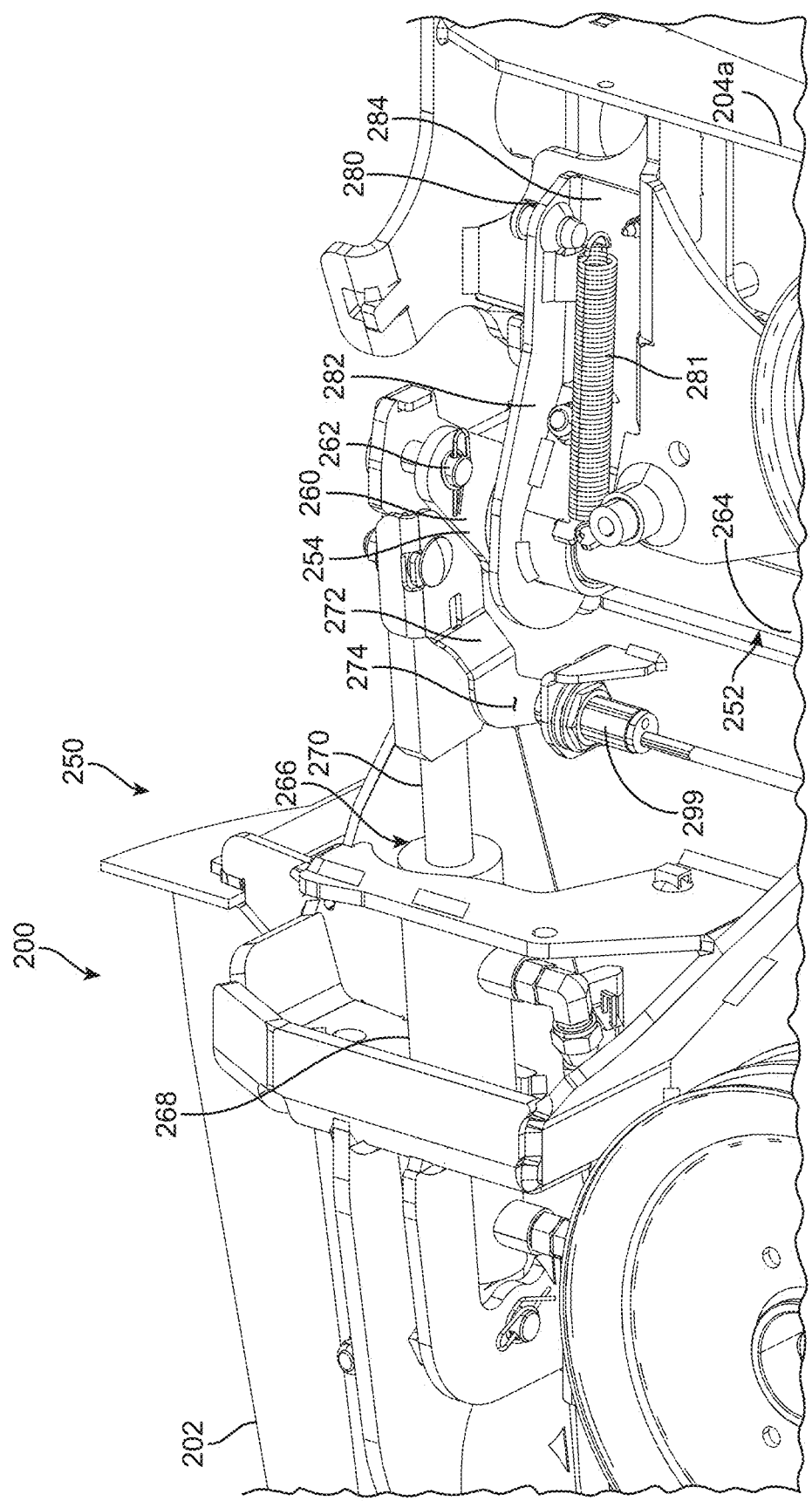
FIG. 10 illustrates an exemplary fold actuator for use with the deck fold mechanism of FIG. 6, the actuator adapted to move the deck between the operating and folded configurations.

In order to provide a lifting (or lowering) force to the lift arm 260, an actuator 266, an example of which is shown in FIG. 10, may be provided (some parts of the deck, e.g., pulleys, are removed in FIG. 10 to better illustrate the actuator 266). The actuator 266 may be configured as a single-ended hydraulic actuator having a cylinder 268 and a rod 270, wherein the rod may selectively extend from and retract toward the cylinder. The cylinder may be pivotally attached to the center deck section 202, and an end of the rod 270 may be pivotally connected (pinned) to the lift arm pivot 262 of the lift arm 260 of the rear bellcrank 254 on the fold link 252. As a result, extension of the actuator 266 (i.e., extension of the rod 270 relative to the cylinder 268) causes the fold link 252 to pivot about the fixed pivot axis 257 (see FIG. 8A) toward the first position and thus the wing deck section 204a to move to the operating position. Similarly, retraction of the actuator (i.e., retraction of the rod relative to the cylinder) causes the fold link 252 to pivot about the fixed pivot axis 257 toward the second position (see FIG. 9) and thus the wing deck section to move to the folded position. While illustrated herein as using the linear actuator 266, such a configuration is not limiting. That is, other embodiments may utilize other types of actuators (e.g., mechanical, electrical, pneumatic, rotary, linear, etc.) as well as actuators that are positioned differently than that illustrated.

The fold link 252 may have operatively attached thereto a target 274. For instance, in the embodiment illustrated in FIG. 10, the target 274 is attached to a bracket 272 connected to the rod 270 of the actuator 266. When the actuator 266 is extended (i.e., when the rod 270 moves outwardly such that the wing deck section is placed in the operating position), the target 274 is detected or otherwise registered by a sensor (e.g., non-contacting proximity switch 299). Detection of the target 274 may be a prerequisite to operation of the cutting deck 200 (e.g., the PTO clutch providing power to the drive shaft 208 (see FIG. 4) may be unable to engage unless the switch 299 senses the wing deck section is in the operating position).

When the cutting deck is in the operating configuration as shown in FIG. 8A, the bellcranks 254 (e.g., the fold link 252 of FIG. 7) may be generally fixed relative to the center deck section 202 (i.e., in the first position). However, the wing deck section 204a may be able to pivot, about the wing pivot 258 (e.g., wing pivot axis 259), both: upwardly as shown also in FIG. 8C by an angular displacement 275; and downwardly as shown in FIG. 8B by an angular displacement 276. For example, in one embodiment, the angular displacement 275 is 20 degrees up, and the angular displacement 276 is 15 degrees down. As a result, the wing deck sections 204 may float +20 degrees and −15 degrees during operation (i.e., while the deck is in the operating configuration and the bellcranks are in the first position), allowing the wing deck section to better follow contoured turf surfaces.

Figure 11:
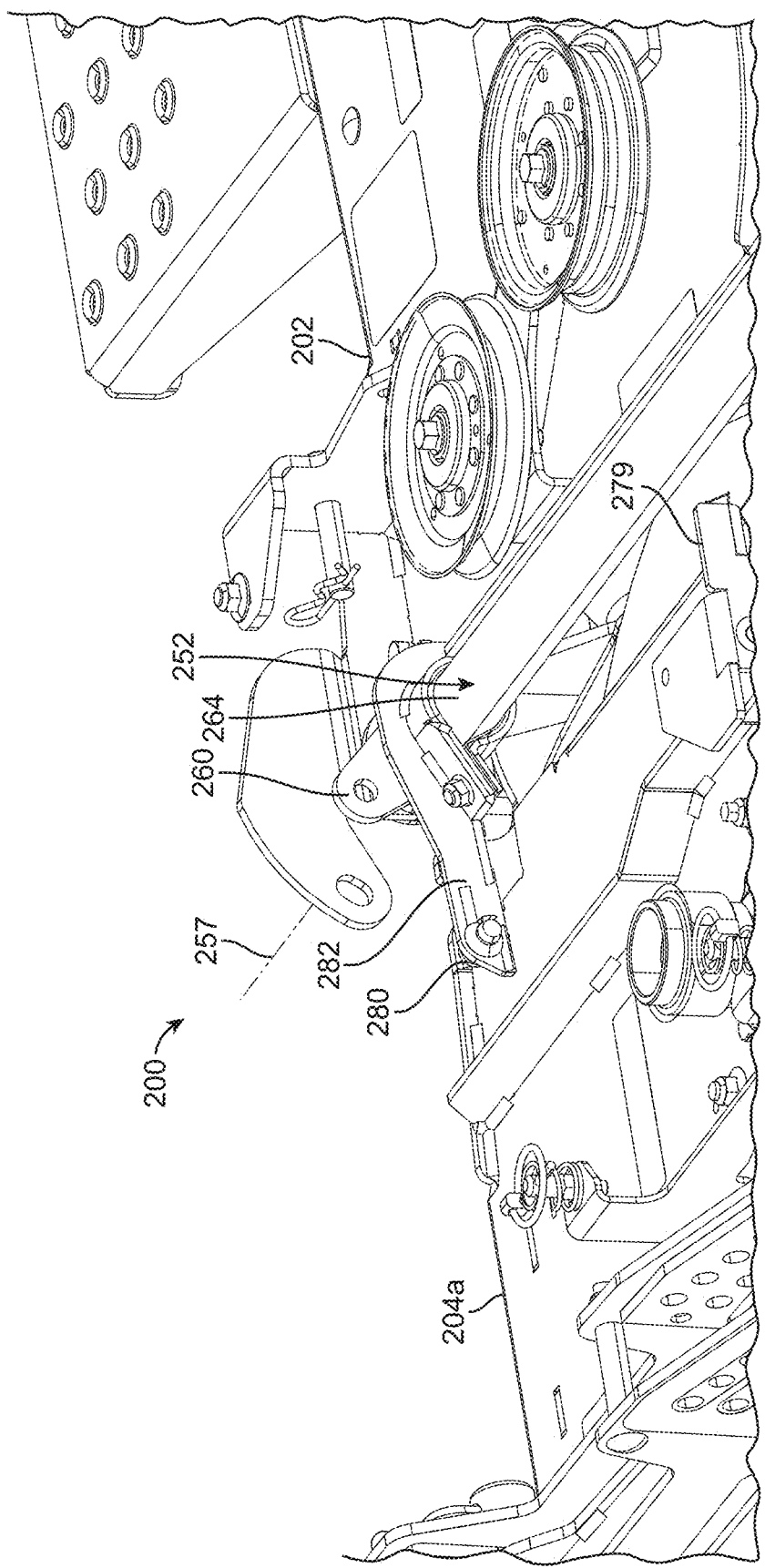
FIG. 11 illustrates a down float stop of the deck of FIG. 6, the down float stop adapted to limit downward float movement of the wing deck section when the deck is in the operating configuration.

To limit downward float of the wing deck section 202 when in the operating position, the fold mechanism 250 may further include a down float stop 278 formed on the wing deck section as shown in FIG. 8A. The down float stop 278 may form an abutting surface adapted to interact with (e.g., abut with) a tab 280 when the wing deck section reaches its downward angular limit (defined as the angular displacement 276 in FIG. 8A). In the illustrated embodiments, the tab 280 may be a stud or pin affixed to a leg 282 as shown in FIG. 11. In some embodiments, a leg 282 may be provided near the front and rear sides of the fold link 252, wherein each of the legs is connected to the other by a sheet metal panel 284 (panel 284 not shown in FIG. 11, but see FIGS. 10 and 13A). The legs 282 may be journalled for rotation about the pivot tube 264 of the fold link 252 such that, the legs may rotate about the fixed pivot axis 257 independent of the pivot tube. A spring 281 (see FIG. 10) or other biasing member may bias the sheet metal panel 284 and thus the legs 282 and tabs 280, against an upper surface of the wing deck section. In some embodiments, a sheet metal bracket 279 (see, e.g., FIGS. 11 and 13A) may be secured to the wing deck section 204 and hold the panel 284 in close proximity to the upper surface of the wing deck section as the wing deck section articulates.

As shown in FIG. 12, during operation, the wing deck section 204a may float downwardly (clockwise in FIG. 12) about the wing pivot axis 259. As this occurs, the down float stop 278 may also pivot about the wing pivot axis 259 as indicated by the arc 283 in FIG. 12. The tab 280, on the other hand, may pivot about the fixed pivot axis 257 as indicated by the arc 295 shown in FIG. 12 as it is biased against the upper surface of the wing deck section 204a. When the travel paths of the down float stop 278 and the tab intersect, they abut one another, effectively stopping further downward float, i.e., the stop 278 and tab 280 define a down float limit.

Figure 13A:
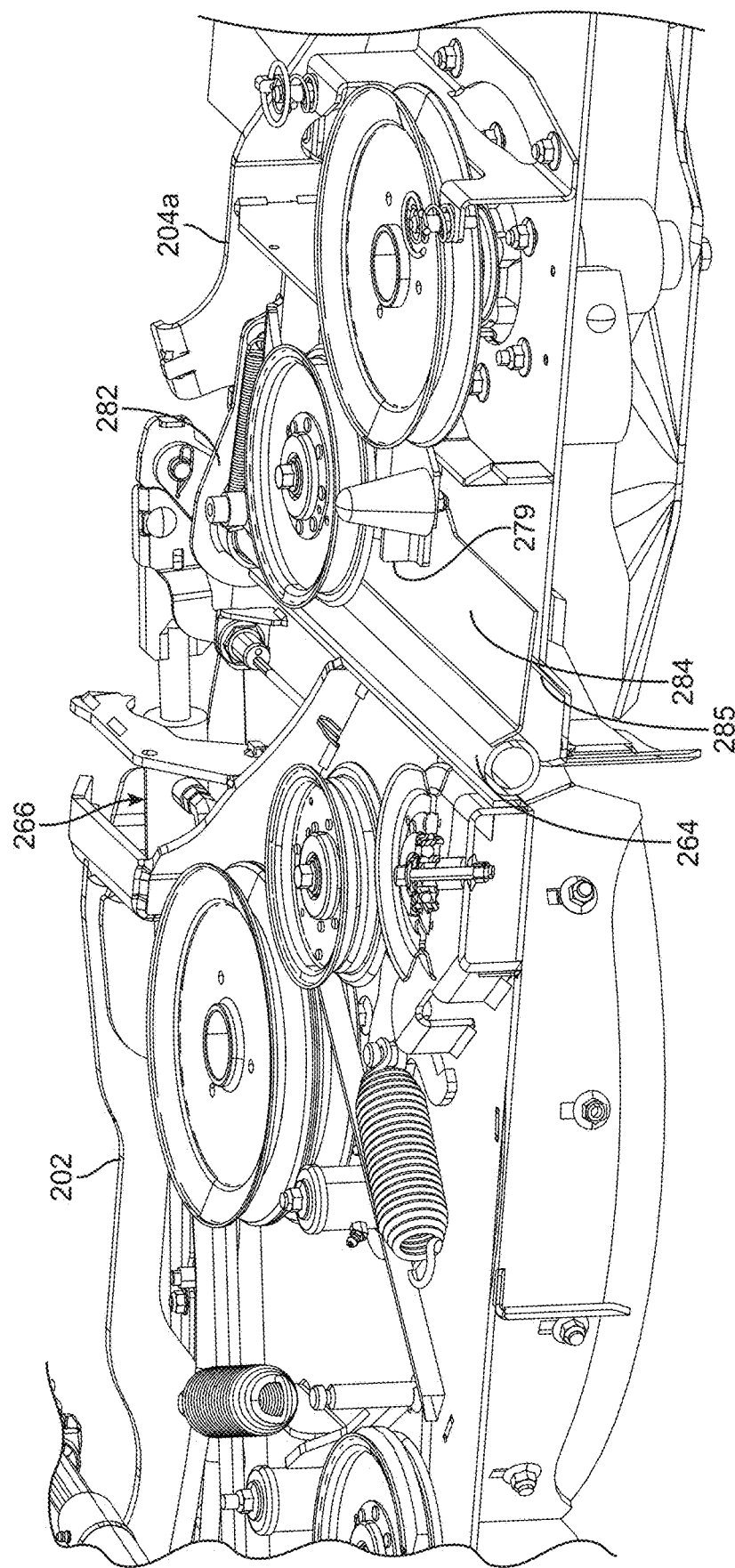

In some embodiments, the sheet metal panel 284 that forms the legs 282 may further form a debris shield as shown in the cross section of FIG. 13A. The debris shield may reduce the introduction of debris (e.g., by partially covering an opening formed between the center deck section 202 and the wing deck section 204a) to the top of the deck sections.

Figure 14A:
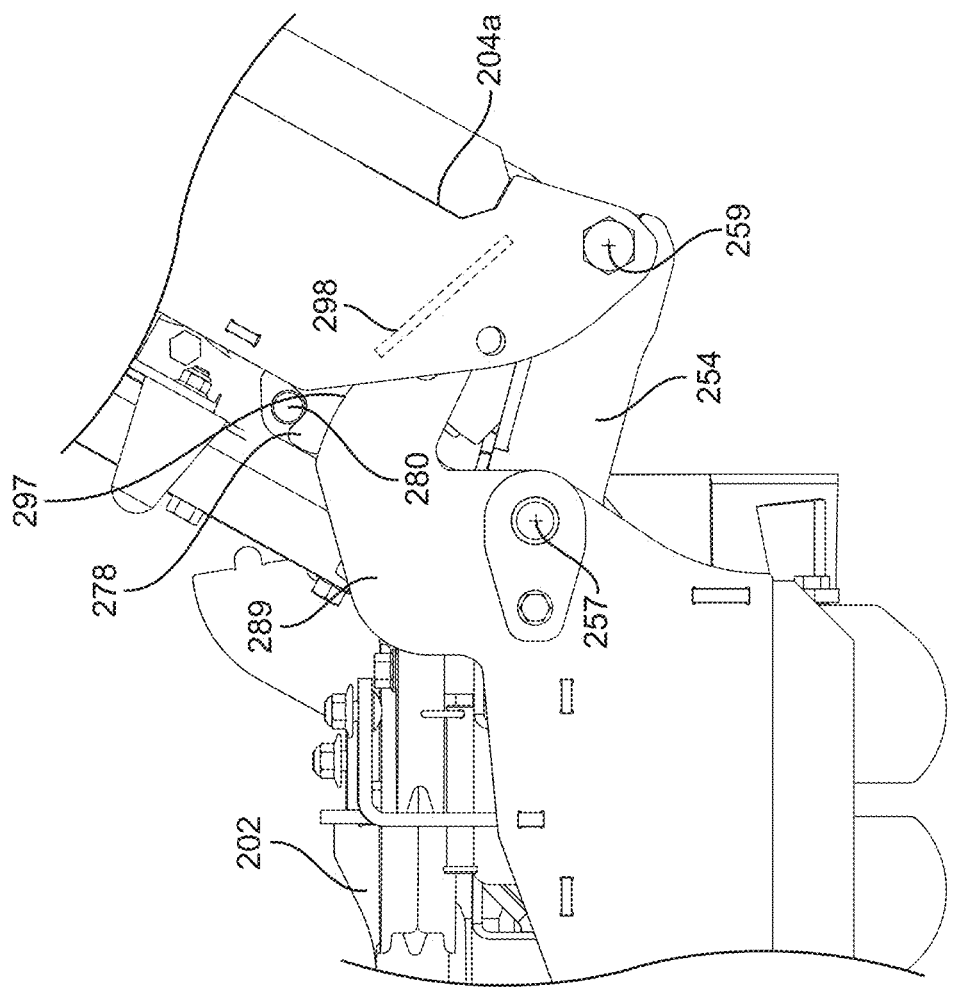

In addition to providing a downward float stop, interaction of the stop 278/tab 280 also assists in transitioning the wing deck sections 204 between the operating position and the folded position. For example, upon initial rotation of the fold link 252 out of the first position (e.g., as may occur when initially moving the wing deck section from the operating to the folded position), the wing deck section 204 may not initially raise (e.g., it may remain supported by the wing deck gauge wheels 218) due to the downward float permitted by the stop 278/tab 280. However, once the stop 278/tab 280 contact one another as shown in FIG. 14A, further movement of the fold link 252 will cause corresponding movement of the wing deck section toward the folded position as the wing deck gauge wheels rise from the ground surface.

Figure 14B:
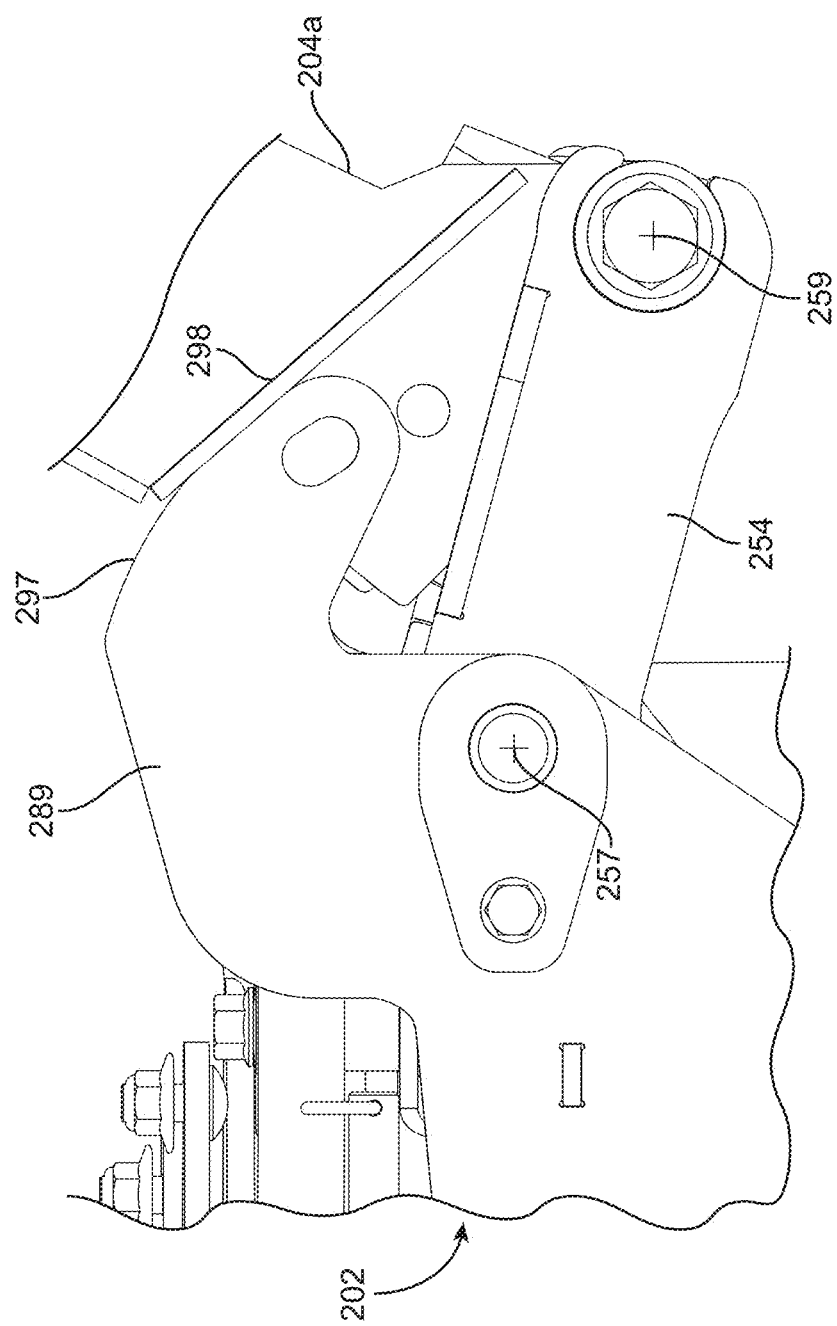

In some embodiments, the fold mechanism may include features that assist in immobilizing the wing deck section about the wing pivot axis 259. For example, as shown in FIGS. 14A and 14B, the center deck section may include an ear 289 that defines a cam surface 297 (see also FIG. 12). The ear 289 and cam surface 297 may be configured to engage a surface (e.g., plate 298) associated with the wing deck section 204 during movement of the wing deck section from the operating position to the folded position. This engagement may begin once the wing deck section 204 reaches a certain point in the folding process (the plate 298 is shown in broken lines in FIG. 14A as it is located behind a portion of the wing deck weldment, the portion being removed to illustrate the plate in FIG. 14B). The contact of the cam surface 297 with the plate 298 may constrain or minimize pivotal movement of the wing deck section 204 about the wing pivot axis 259 as the wing deck section approaches, and while it is in, the folded position. As a result, the wing deck section may not inadvertently pivot about the wing pivot 258 (wing pivot axis 259) while moving toward or after reaching the folded position.

In addition to providing a down float stop, the fold mechanism 250 may further include an up float stop to provide an up float limit or hard stop against upward float exceeding the predetermined angular displacement 275 (see FIGS. 8A and 8C) when the wing deck section is in the operating position. In one embodiment, the up float stop is provided by a bent portion 285 of the wing deck section as shown in the partial section view of FIG. 13A. As the wing deck section 204 is displaced upwardly (e.g., about the wing pivot axis 259), the bent portion 285 eventually abuts the pivot tube 264 as shown in FIG. 13B once the wing deck section reaches its upward angular limit (again, defined as the angular displacement 275 in FIG. 8C).

When the wing deck section 204 is in the operating position, the wing pivot axis 259 (see FIG. 8A) may be located at an elevation approximately equal to an elevation of the mower blades 203 (see FIG. 3) associated with both the center deck section 202 and the wing deck section 204. As a result, as the wing deck section 204 floats during operation, the lateral position of a blade tip circle of the wing deck blade 203 (e.g., an edge of a surface of rotation defined by the tip of the wing deck blade), may remain at a relatively constant distance from a blade tip circle of the adjacent blade of the center deck section 202. Such a construction may minimize uncut swaths of turf when mowing contoured turf surfaces.

Figure 15:
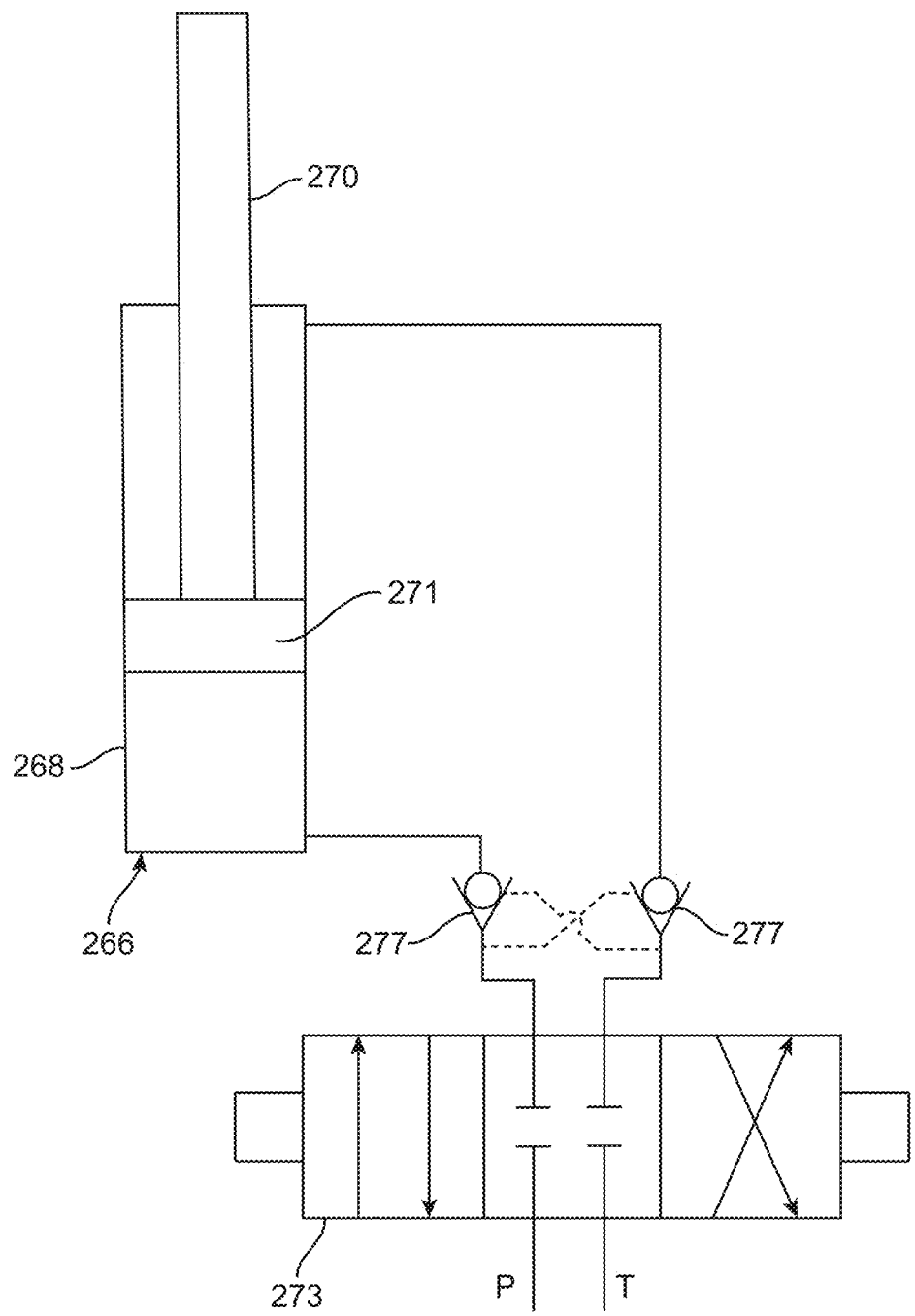
FIG. 15 is an exemplary partial hydraulic system schematic for controlling the fold actuator of FIG. 10.

In some embodiments, the fold link 252 is held in place, both when in the operating position and in the folded position, by the actuator 266 shown in FIG. 10. FIG. 15 illustrates an exemplary partial hydraulic system circuit for use with the actuator 266 in accordance with one embodiment of the present disclosure. As shown in this figure, a control valve 273 may be provided to selectively: provide pressure P to either side of a piston 271 of the cylinder 268 and return fluid from the opposite side of the piston to tank T; or to terminate hydraulic flow entirely. When the control valve is set to terminate flow, leakage may still allow the actuator (the rod 270) to creep. To address creeping, the circuit may also include pilot-operated check valves 277 on both sides of the piston 271. The check valves provide improved hydraulic sealing, reducing or even effectively eliminating actuator creep once hydraulic flow is terminated. By locking the actuator (with the check valves) at a fixed length when the wing deck section is in the operating position, a constant distance between the center deck section and the wing deck section, and thus a constant distance between blade tip circles of the two deck sections, may be maintained. Maintaining blade tip circle distance may again provide a high quality of cut by minimizing uncut swaths of grass between the two deck sections.

Accordingly, once the rod 270 has moved to the desired position (corresponding to the wing deck section being up (folded position corresponding to the second position of the fold link) or down (operating position corresponding to the first position of the fold link), the hydraulic control system used to control deck operation may hydraulically lock the cylinder (and thus the rod) in place by terminating hydraulic flow to the cylinder. With no hydraulic flow to the cylinder, the pilot pressure to the check valves 277 also terminates, allowing the check valves to close and thus hydraulically lock the cylinder 268 (the rod 270) in place. "Hydraulic locking" refers to the ability to hold the rod 270 in place using a static column of hydraulic fluid (e.g., a column extending between the piston 271 and each of the check valves 277). Hydraulic locking thus allows the hydraulic system to hold the wing deck section in place without undesirable hydraulic leakage and without requiring constant pressurized flow to the cylinder. Moreover, hydraulic locking also permits the wing deck sections to be held in place without the need for additional linkages or latch mechanisms.

Fold mechanisms like those described herein thus prevent the wing deck section from pivoting upwardly beyond the range defined by the up float stop as hydraulic locking will not allow the fold link to rotate. However, by providing the target 274 and sensor 299 (see FIG. 10), decks in accordance with embodiments of the present disclosure may be adapted to disable power to the blades generally immediately upon receiving a command to move the wing deck section to the folded position. That is, the target 274 may move out of range of the sensor 299 before the wing deck section begins to pivot upwardly. As a result, the spinning blade of the wing deck section may be slowed or even stopped by the time the wing deck section begins to lift toward the folded position. Stated yet another way, the deck drive system may provide power to the wing deck section when the associated fold link is in the first position, and automatically terminate power to the wing deck section when the associated fold link moves out of the first position (e.g., using the sensor 299 to detect when the fold link moves out of the first position).

While the wing deck section 204 may be held in place via hydraulic locking, embodiments of the present disclosure may provide a mechanical lock system that may be used to, for example, hold the wing deck section in the folded position when hydraulics are not operating (e.g., during mower maintenance). For instance, in one embodiment, the ear 289 of the center deck section may include an aperture 287 as shown in FIG. 12. The wing deck section 204a may include a corresponding aperture 288 that aligns with the aperture 287 when the wing deck section is in the folded position as shown in FIG. 5. As a result, a pin 294 may be inserted through the aligned apertures 287, 288 to effectively lock the wing deck section in the folded position.

The cutting deck 200 may further include features that prevent the wing deck section 204 from moving too far either toward the operating position; or toward the folded position. For example, when extending the actuator 266 to place the wing deck section in the operating position, the deck arm 255 of the bellcrank 254 may contact structure of the center deck section as indicated in FIG. 8A. Such contact may prevent the bellcrank from rotating, and thus the cylinder 266 from extending, any further than necessary.

Figure 16:
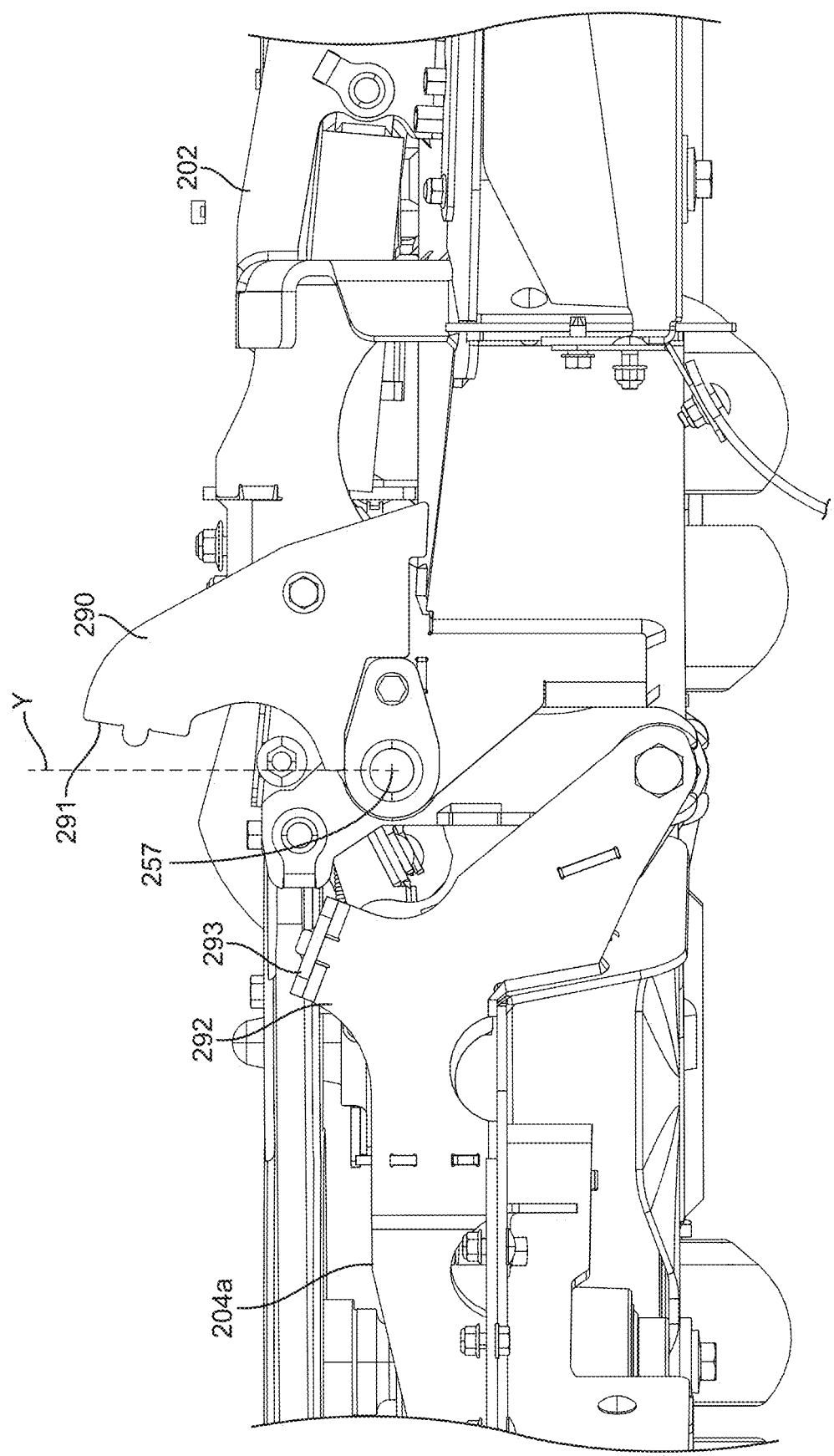
FIG. 16 illustrates an exemplary fold stop adapted to limit movement of a wing deck section beyond its folded position.

Similarly, as shown in FIG. 16, the cutting deck may provide a similar stop to prevent the wing deck section 204 from moving beyond the desired folded position. For instance, in the illustrated embodiment, the center deck section 202 may include a first stop 290 defining a first stop surface 291 adapted to abut a second stop surface 293 formed on a second stop 292 associated with the wing deck section 204 once the latter reaches the folded position.

Figure 17A:
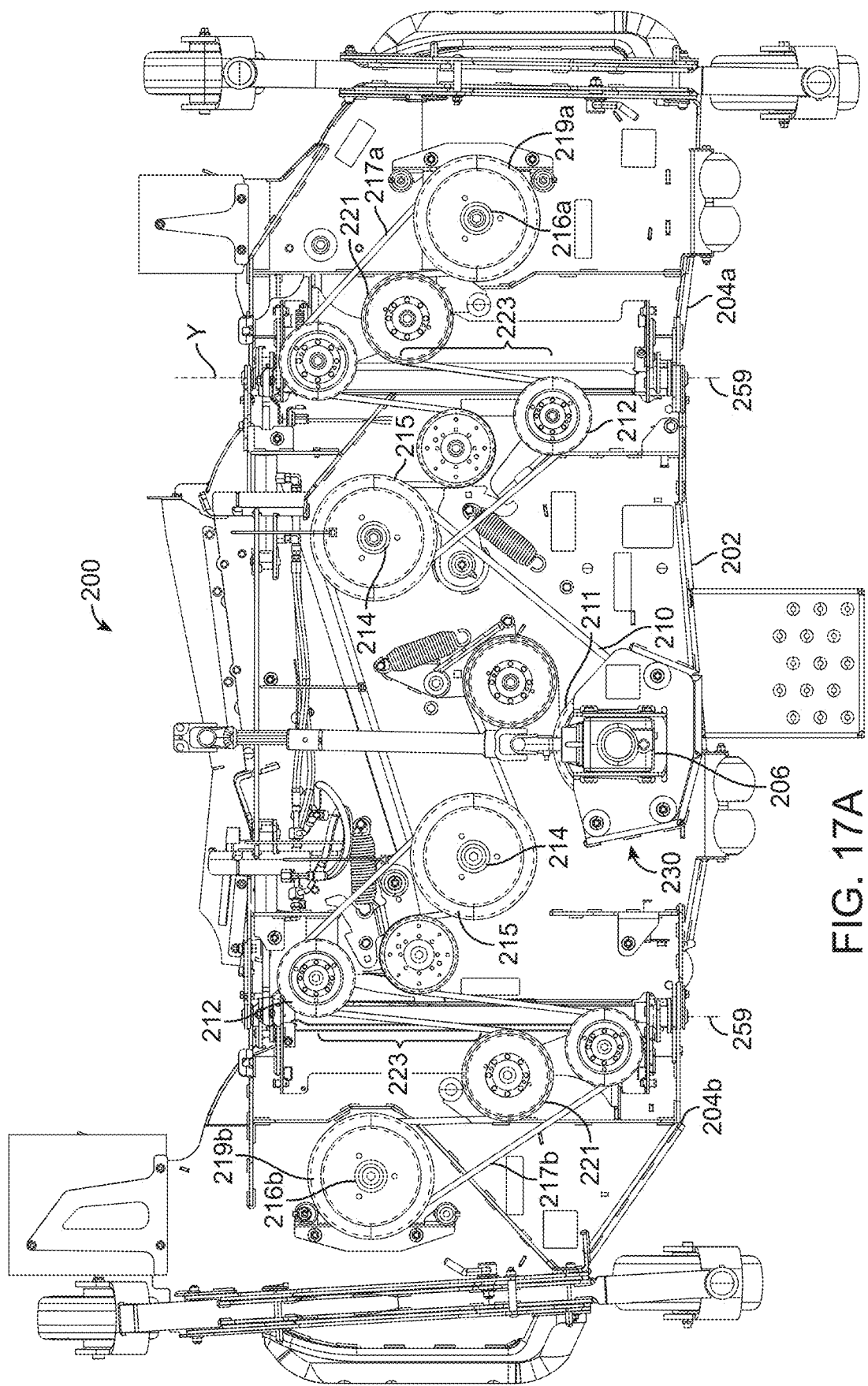

While various deck drive systems are possible without departing from the scope of this disclosure, FIG. 17A illustrates a top plan view of the cutting deck 200 of FIG. 4 using an exemplary deck drive system 230. As already described herein with reference to FIG. 4, the drive system 230 may include the gearbox 206 that operatively powers a drive pulley 211 that, in turn, drives the drive belt 210. The drive belt 210 may engage various idler pulleys as well as two spindle pulleys 215. Each of the spindle pulleys 215 may include a second pulley groove such that a wing deck drive belt 217 (217a, 217b) may be driven from each spindle pulley 215. Each wing deck drive belt 217 may then engage various idler pulleys and a spindle pulley 219 on the wing deck section. Thus, when the gearbox 206 is energized, the blade spindles 214 and 216 may receive power.

Figure 17B:
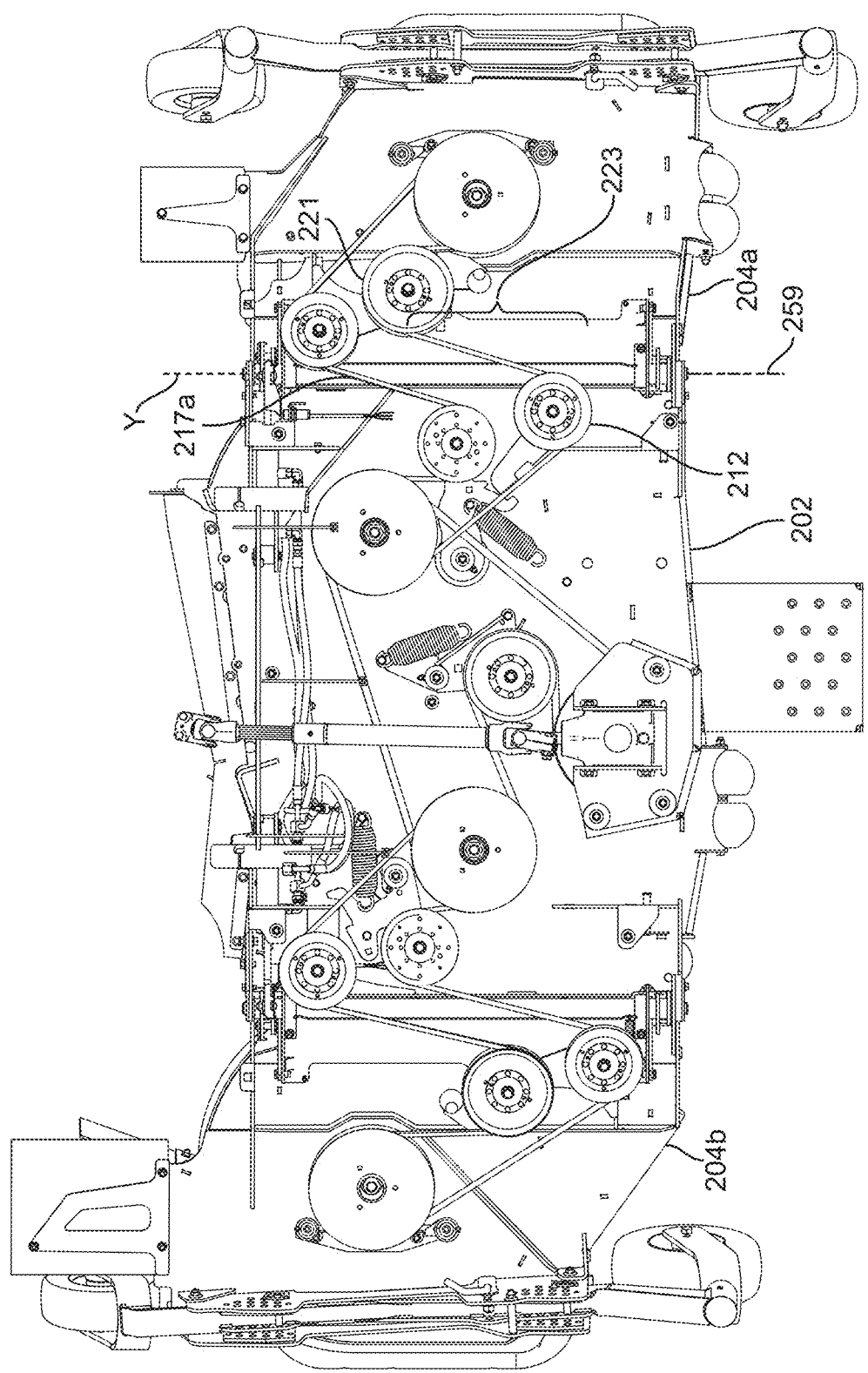
Figure 17C:
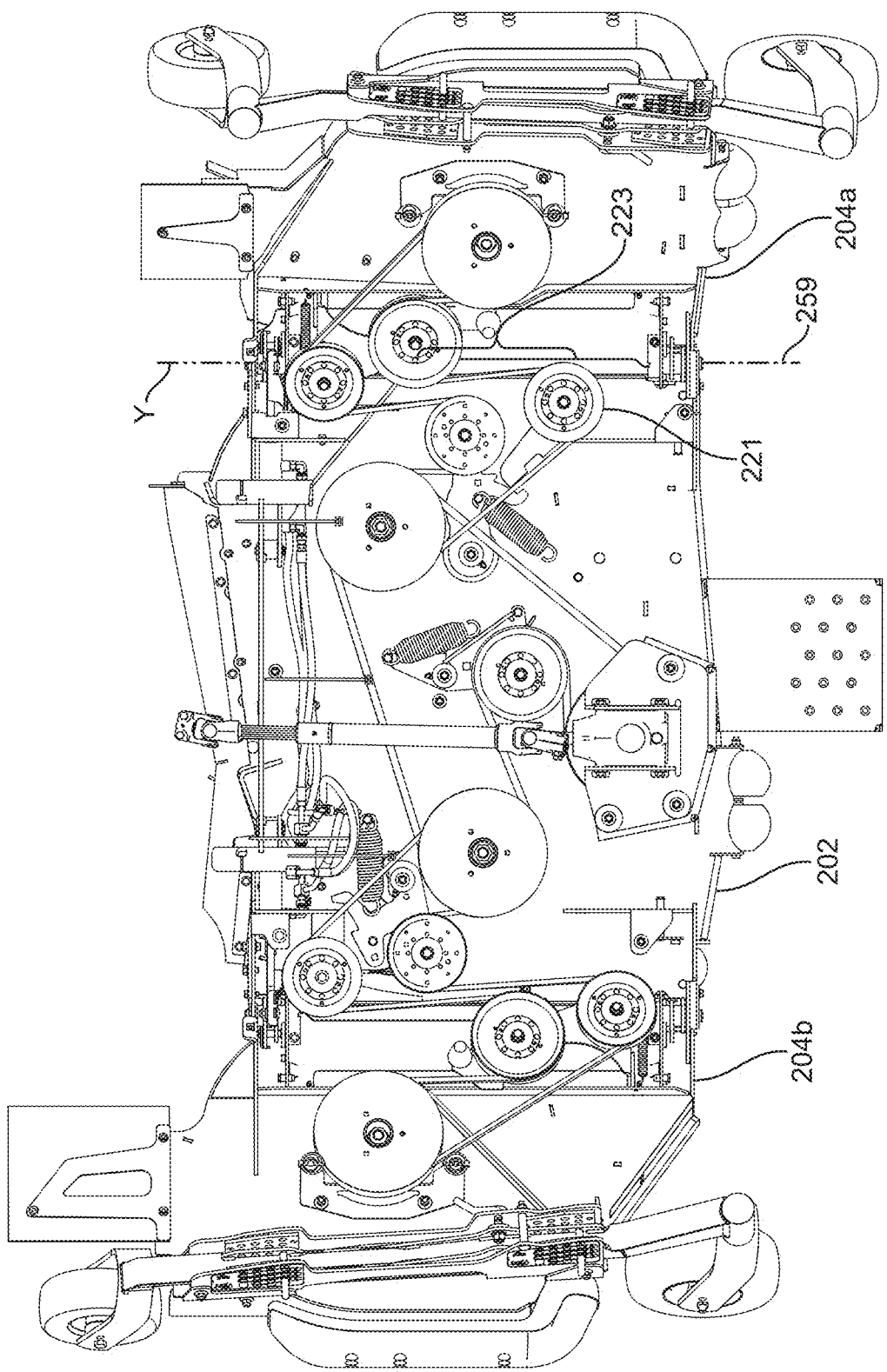

As further shown in FIG. 17A, the routing of each wing deck drive belt 217 may be such that a section (e.g., section 223) of the wing deck drive belt extending between a first pulley (pulley 212) on the center deck section 202 and a second pulley (pulley 221) on the wing deck section 204a intersects a vertical plane Y (see also FIG. 16) parallel to the first pivot axis (e.g., a vertical plane parallel to a vertical plane containing the wing pivot axis 259) at a positive angle (e.g., section 223 of belt 217a near wing deck section 204a extends outwardly toward the rear moving from the center deck section 202 to the wing deck section 204a) when the wing deck section is in the operating position and at or near its down float stop (see also FIG. 8B) as shown in FIG. 17B. However, when the wing deck section 204a is in the operating position and at or near the up float stop (see also FIG. 8C), the section 223 of the belt 217a will intersect the same vertical plane Y at a negative angle (e.g., section 223 extends inwardly toward the rear moving from the center deck section to the wing deck section) as shown in FIG. 17C. As shown in FIGS. 17B and 17C, this occurs due to the tangent point of the wing drive belt 217 with the pulley 221 being at or near the plane Y (e.g., at or near a vertical plane containing the wing pivot axis 259). As a result of this construction, full range floating of the wing deck section 204a during deck operation, as well as movement of the wing deck section to the folded position (see FIG. 5) produces only minimal slack in the belt 217 (which may be easily accommodated by the various idler pulleys), thereby reducing the chance that the belts 217 may separate from the various pulleys when the wing deck sections are articulating. Although illustrated herein as moving the belt section 223 across a vertical plane containing the wing pivot axis 259, other embodiments may keep the belt section 223 on only one side of the vertical plane as the wing deck section floats between its upper and lower float stops.

Cutting decks in accordance with embodiments of the present disclosure may provide various benefits over existing articulating deck constructions. For instance, by starting with a standard or universal center deck section 202 like that illustrated in FIG. 17A (see also FIG. 4), various deck widths may be achieved merely by switching out the various wing deck sections. For example, in some embodiments, the center deck section 202 may provide dual spindles/blades providing a base cutting width of 48 inches. Each wing deck section 204a, 204b may add a single spindle/blade section that provides a cutting width of 24 inches (or each may provide a different width), yielding a first articulating cutting deck width of 96 inches.

Figure 18:
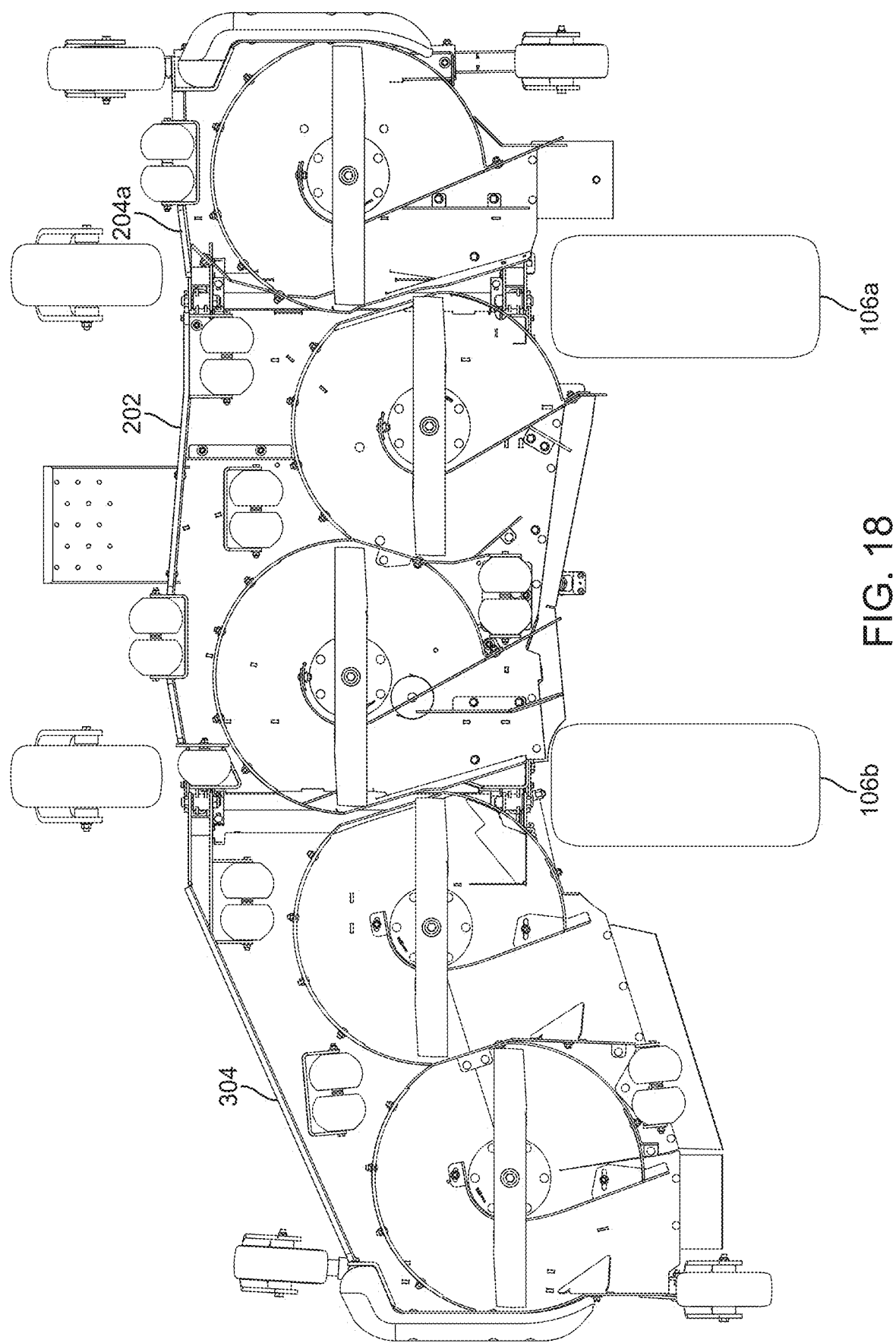
FIG. 18 is a bottom plan view of an alternative deck construction having a dual-spindle wing deck section connected to the center deck section in place of one of the single spindle wing deck sections to produce a cutting deck of different, e.g., increased, width.

However, additional wing deck sections may also be provided in place of either or both of the wing deck section 204a and 204b. For example, as shown in FIG. 18, one of the wing deck sections (e.g., the deck section 204b) may be replaced with a dual spindle/blade deck section 304 providing an effective width of 48 inches, yielding a second articulating cutting deck width of 120 inches (including the 24-inch wing deck section 204a).

The interfacing hardware (e.g., fold mechanism 250 as described above) for the deck section 304 may be identical to that of the deck section 204 already described herein. Moreover, power may be provided to the dual spindle/blade wing deck section 304 via replacement of the belt 217b (see FIG. 17A) with a longer belt adapted to route to the dual spindle configuration of the larger wing deck section.

While only two deck configurations are illustrated herein (e.g., 96-inch and 120 inch), most any size and combination of wing deck sections are contemplated. For instance, in addition to replacing the wing deck section 204b with the wing deck section 304, the wing deck section 204a could also be replaced with a different (e.g., larger) wing deck section. In addition, wing deck sections could be attached outboard of the existing wing deck sections to provide a cutting deck having three or more articulating joints. Further, while shown as providing only 24-inch and 48-inch wing deck sections, wing deck sections of most any width (and any number of spindle/blades) are possible, limited primarily by the ability of the mower to support and provide power thereto.

Such a modular deck system may allow a dealer/distributor to stock independent, modular deck sections that may subsequently be assembled into decks of different cutting widths. As a result, providing a range of cutting deck widths may be possible with a relatively small inventory of interchangeable wing deck sections.

Figure 19:
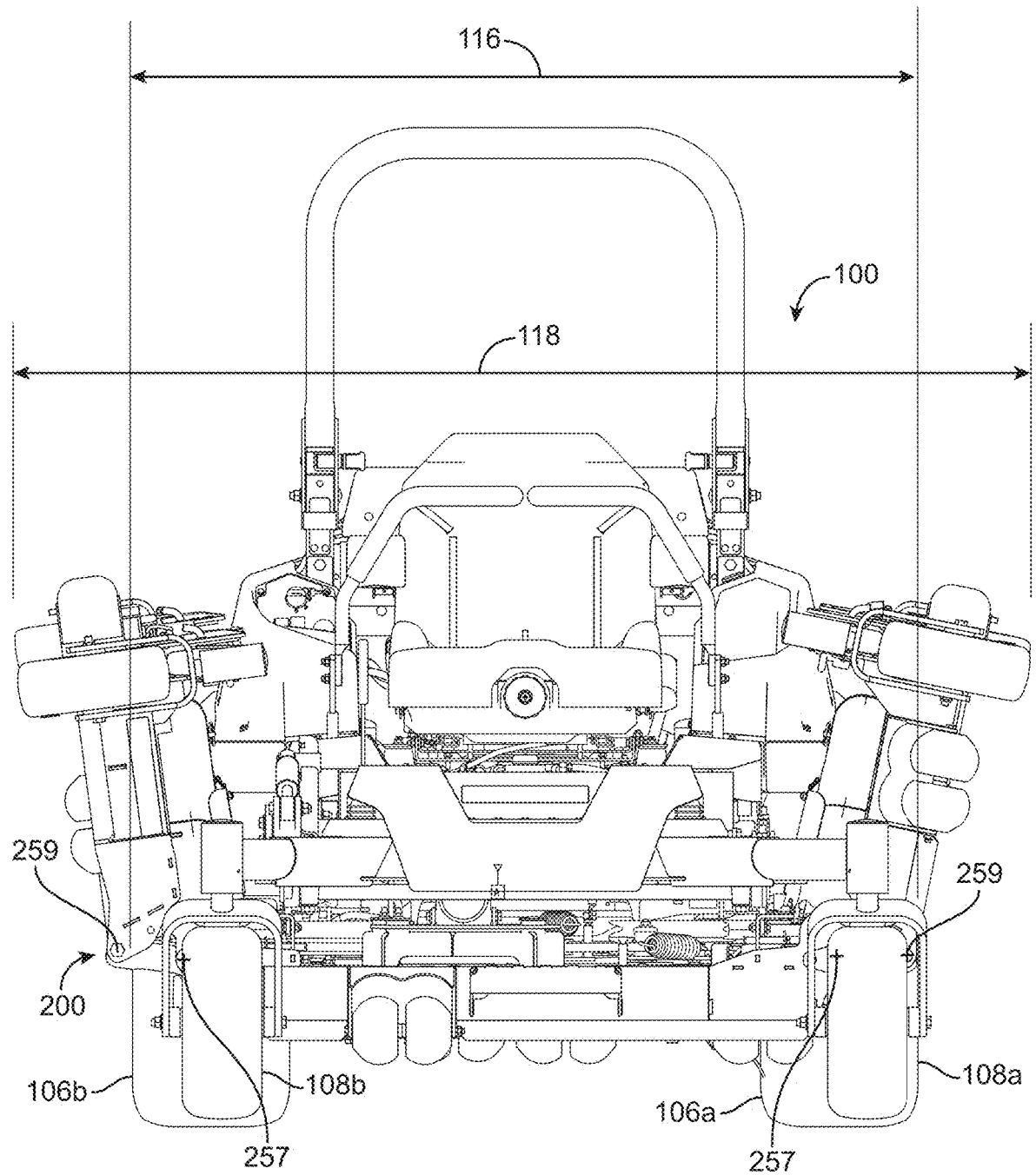
FIG. 19 is a front elevation view of the mower of FIG. 2 with the cutting deck shown in the folded configuration (e.g., left- and right-wing deck sections each shown in the folded position)

In some embodiments, the universal center deck section 202 may be configured to be of a width (e.g., 48 inches or less) that is less than a track width 116 (maximum width of tires of the rear wheels 106 when the tires are inflated to normal operating pressure and the mower is under normal weight load) of the mower 100. For example, in FIG. 19, the mower 100 has a track width 116 of 57.4 inches. As a result, when the deck is configured as a 96-inch cutting width as shown, both fixed pivot axes 257 may be located within the track width 116 as shown in FIG. 19. Moreover, at least one (e.g., the left) wing pivot axis 259 may also be located within the track width 116 as shown. Such a configuration may permit the mower 100 to have a transport width 118 that is only minimally wider than the track width 116. For instance, in one embodiment, the transport width 118 is 72-73 inches (e.g., 72.5 inches when the deck 200 is set for a three-inch height of cut). As a result, the mower 100 may be transported on conventional trailers while still providing the stability and control associated with a wide wheel track vehicle. In embodiments wherein the fixed pivot axes 257 and/or wing pivot axes 259 are not parallel to a longitudinal axis of the mower 100, the axes are defined to be "within the track width" if the axes are completely within the track width when the axes are bounded by: a first vertical plane containing a rotational axis of the rear drive wheels; and a second vertical plane containing a rotational axis of the front wheels (when the casters wheels are oriented for straight-ahead travel).

Cutting decks in accordance with embodiments of the present disclosure may achieve low transport width 118 by allowing the wing deck sections, when in the folded position, to be positioned at least partially over, and/or forward of, the rear drive wheels 106. For instance, as shown in FIG. 20, the wing deck section 204b may, when in the folded position, have portions (e.g., a rear discharge chute) that extend above the rear drive wheel 106b. Many articulating decks, especially those provided on belly-mounted mowers in general (and ZTR mowers specifically) are not able to fold the wing deck sections inwardly to the degree described herein because the wing deck sections are unable to fold above the rear wheels as shown in FIGS. 19 and 20.

Articulating cutting decks in accordance with embodiments of the present disclosure may thus provide various benefits including, for example, a wing cutting deck that stays operatively powered throughout its entire float range (i.e., does not inadvertently disengage if the wing deck section floats excessively upwardly). However, upon an operator command to fold, power to the wing deck section may be immediately terminated, thereby beginning the process of slowing the blades before the wing deck section starts to rise toward the folded position. In some embodiments, this is accommodated by the sensor and target as described herein. However, other embodiments are also contemplated. For instance, in vehicles having an electronic control unit that monitors various mower subsystems (see, e.g., US Pat. App. Pub. No. 2017-0196164), actuation of a deck fold switch by the operator could immediately terminate power delivery to the cutting deck and achieve a similar benefit.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:

1. A mower cutting deck comprising:
a center deck section;
a wing deck section comprising at least one cutting blade;
a fold link connecting the center deck section to the wing deck section, the fold link comprising two spaced-apart bellcranks and a pivot tube, the pivot tube extending between, and fixed to, the two spaced-apart bellcranks, wherein the fold link further comprises:
a first pivot pivotally connecting the fold link to the center deck section, the first pivot defining a first pivot axis; and
a second pivot defining a second pivot axis offset from the first pivot axis, the second pivot pivotally connecting the fold link to the wing deck section, wherein the fold link is adapted to pivot about the first pivot between: a first position corresponding to the wing deck section being in an operating position;

and a second position corresponding to the wing deck section being in a folded position;

an actuator coupled to the center deck section and to the fold link, wherein the actuator is configured to apply both: a first force to the fold link that causes the fold link to pivot, about the first pivot axis, from the first position toward the second position; and an opposite second force to the fold link that causes the fold link to pivot, about the first pivot axis, from the second position toward the first position; and a deck drive system adapted to provide power to the wing deck section to rotate the cutting blade when the fold link is in the first position, and automatically terminate power to the wing deck section upon actuator-initiated movement of the fold link out of the first position.

2. The deck of claim 1, further comprising a sensor operable to detect when the fold link moves out of the first position.

3. The deck of claim 2, further comprising a target operatively connected to the fold link, wherein the target is detectable by the sensor.

4. The deck of claim 1, wherein the wing deck section, when in the operating position, is constrained to pivoting, about the second pivot, between a down float stop and an up float stop.

5. The deck of claim 4, wherein the down float stop comprises:
a tab connected to the fold link and adapted to pivot about the first pivot axis; and
an abutting surface attached to the wing deck section, wherein the abutting surface is adapted to pivot about the second pivot axis when the wing deck section is in the operating position.

6. The deck of claim 5, wherein the abutting surface contacts the tab to assist in moving the wing deck section from the operation position to the folded position.

7. The deck of claim 5, wherein the tab further comprises a debris shield partially covering an opening between the center deck section and the wing deck section.

8. The deck of claim 4, wherein the deck drive system comprises an endless belt engaged with a first pulley on the center deck section and a second pulley on the wing deck section, and wherein a section of the endless belt extending between the first and second pulleys intersects a vertical plane parallel to the first pivot axis at a positive angle when the wing deck section is at or near the down float stop of the operating position, and at a negative angle when the wing deck section is at or near the up float stop of the operating position.

9. The deck of claim 1, wherein the center deck section comprises an ear defining a cam surface, wherein the cam surface engages a surface of the wing deck section during movement of the wing deck section from the operating position to the folded position to constrain pivoting of the wing deck section about the second pivot axis.

10. The deck of claim 1, wherein the actuator comprises a hydraulic cylinder connected to a hydraulic system of the mower, and wherein the hydraulic system is adapted to hydraulically lock the cylinder and hold the fold link in the first position and, alternatively, in the second position.

11. The deck of claim 1, wherein the first pivot axis is parallel to the second pivot axis.

12. A mower cutting deck comprising:
a center deck section;
a wing deck section comprising at least one cutting blade;
a fold link connecting the center deck section to the wing deck section, the fold link comprising two spaced-apart bellcranks and a pivot tube, the pivot tube extending between, and fixed to, the two spaced-apart bellcranks, wherein the fold link further comprises:
a first pivot pivotally connecting the fold link to the center deck section, the first pivot defining a first pivot axis; and
a second pivot defining a second pivot axis, the second pivot pivotally connecting the fold link to the wing deck section, wherein the fold link is adapted to pivot about the first pivot between: a first position corresponding to the wing deck section being in an operating position; and a second position corresponding to the wing deck section being in a folded position;
a hydraulic cylinder coupled to the center deck section and to the fold link, wherein extension of the cylinder forces the fold link to pivot, about the first pivot axis, away from the second position toward the first position, and retraction of the cylinder forces the fold link to pivot, about the first pivot axis, away from the first position toward the second position;
a hydraulic system coupled to the cylinder, the hydraulic system configured to hydraulically lock the cylinder when the fold link is in the first position; and
a deck drive system adapted to provide power to the wing deck section to rotate the cutting blade when the fold link is in the first position and terminate power to the wing deck section whenever the cylinder moves the fold link out of the first position.

13. The deck of claim 12, further comprising a sensor in communication with the deck drive system, the sensor configured to detect when the fold link is in the first position.

* * * * *